US006782091B1

(12) United States Patent
Dunning, III

(10) Patent No.: US 6,782,091 B1
(45) Date of Patent: Aug. 24, 2004

(54) VIRTUAL CALL DISTRIBUTION SYSTEM

(76) Inventor: Emerson C. Dunning, III, 1277 46th Ave., San Francisco, CA (US) 94122

( * ) Notice: Subject to any disclaimer, the term of this patent is extended or adjusted under 35 U.S.C. 154(b) by 356 days.

(21) Appl. No.: 09/687,697

(22) Filed: Oct. 13, 2000

(51) Int. Cl.[7] .................................................. H04M 3/00
(52) U.S. Cl. .............................. 379/265.01; 379/265.09
(58) Field of Search ....................... 379/265.01, 266.09, 379/266.1, 265.09, 265.02, 266.07; 705/14, 10

(56) References Cited

U.S. PATENT DOCUMENTS

| | | | | |
|---|---|---|---|---|
| 4,989,233 A | * | 1/1991 | Schakowsky et al. | ..... 379/92.03 |
| 5,027,383 A | | 6/1991 | Sheffer | |
| 5,073,890 A | * | 12/1991 | Danielsen | .................... 370/270 |
| 5,210,789 A | * | 5/1993 | Jeffus et al. | ........... 379/127.01 |
| 5,353,168 A | | 10/1994 | Crick | |
| 5,488,651 A | | 1/1996 | Giler et al. | |
| 5,546,452 A | * | 8/1996 | Andrews et al. | ............. 379/219 |
| 5,555,497 A | * | 9/1996 | Helbling | ....................... 705/14 |
| 5,594,791 A | * | 1/1997 | Szlam et al. | ........... 379/265.09 |
| 5,696,366 A | * | 12/1997 | Ziarno | ......................... 235/380 |
| 5,778,060 A | * | 7/1998 | Otto | ....................... 379/266.09 |
| 5,812,642 A | * | 9/1998 | Leroy | ...................... 379/92.01 |
| 5,826,250 A | | 10/1998 | Trefler | |
| 5,835,565 A | | 11/1998 | Smith et al. | |
| 5,884,032 A | * | 3/1999 | Bateman et al. | ............. 709/204 |
| 5,889,774 A | | 3/1999 | Mirashrafi et al. | |
| 5,937,049 A | | 8/1999 | Brady | |
| 5,970,132 A | * | 10/1999 | Brady | .................... 379/212.01 |
| 5,982,857 A | | 11/1999 | Brady | |
| 5,987,118 A | * | 11/1999 | Dickerman et al. | ..... 379/265.01 |
| 6,046,762 A | | 4/2000 | Sonesh et al. | |
| 6,076,093 A | * | 6/2000 | Pickering | .................. 707/104.1 |
| 6,108,704 A | | 8/2000 | Hutton et al. | |
| 6,118,865 A | * | 9/2000 | Gisby | ..................... 379/265.02 |
| 6,122,364 A | * | 9/2000 | Petrunka et al. | ........ 379/265.02 |
| 2001/0043697 A1 | * | 11/2001 | Cox et al. | .............. 379/265.06 |

FOREIGN PATENT DOCUMENTS

| | | |
|---|---|---|
| AU | Pat. 1307799 | 5/1999 |
| CA | Pat. 2238363 | 11/1998 |
| WO | WO 97/12448 | 4/1997 |
| WO | WO 9956447 | 11/1999 |

* cited by examiner

Primary Examiner—Ahmad F. Matar
Assistant Examiner—Rasha S Al-Aubaidi
(74) Attorney, Agent, or Firm—Holme Roberts & Owen LLP

(57) ABSTRACT

The present invention relates to the processing of in-bound telemarketing calls in which an individual calls a telephone number set forth in either an advertisement or a solicitation. In one embodiment of the invention, in-bound telemarketing calls are distributed by an automated call distribution system to a plurality of call centers for processing. Each of the call centers solicits information from the callers according to a script that is conveyed to the center via a computer network, such as the Internet, from an in-bound telemarketing processor. The caller information that is obtained by each call center is conveyed to the in-bound telemarketing processor via the computer network. The information typically orders for the goods/services of an advertiser or a pledge to a solicitor, is conveyed from the in-bound telemarketing processor to the advertiser or solicitor.

32 Claims, 22 Drawing Sheets

Project 1)    Summer 00    Pledge Form:  Page 1    Help

Click here if caller is not making a pledge

Mandatory Information

| Date: | 7/7/00 | |
|---|---|---|
| Time: | 12:36 PM | (Eastern Time) |
| Location: | | |
| Agent: | 1() | |

Greeting

Thanks for calling WGBH!

Pledge amount membership                                                                 Membership Help

| May I take your Pledge? | $ [    ] | *Contributions must be in whole dollar amounts. Do not use decimals. Anytime caller asks if their gift qualifies for a challenge, say YES and check challenge box.* |
|---|---|---|

*See membership help for info on membership levels and benefits*

Options:    ☐ Senior    ☐ Student    ☐ Challenge

What program were you watching?

| What program are you watching? | -Select One- ▼ | Show All Programs |
|---|---|---|

Save/Continue    Cancel Pledge

| Project 1) | Summer 00 | Pledge Form: Page 2 | Help |
|---|---|---|---|

| Gift Selection | Gift - Donation Level - Qty Available |
|---|---|

Would you like to receive a thank you gift OR have all your pledge go to programming?

| Gift 1: | -Select One- |
|---|---|
| Gift 2: | -Select One- |

If caller wants a gift, choose from the list. If no gift go directly to name and address. Caller may choose 2 gifts so long as value adds up to no more than the amount pledged.

[ Show All Gifts ]

Name and Address:

| Title: | | |
|---|---|---|
| First name: | | *CORRECT SPELLING IS VERY IMPORTANT!!!!* |
| Middle Initial: | | |
| Last name: | | *ALWAYS SPELL BACK NAME AND ADDRESS INFO!!!!* |
| Suffix: | | |
| Second name: | | *Use this field if caller asks for a second name on membership card* |
| Street number: | | *Enter street number in this field* |
| Second name: | | *Enter street name here-if PO Box enter here* |
| Apartment: | | |
| City, state, zip | | *If Canadian: Choose Canada, enter postal code in zip field. In state: use NS for Nova Scotia, NB for New Brunswick, NF for Newfoundland, OT for Ontario, QU for Quebec* |
| Country: | | |

| Project 1) | Summer 00 | Pledge Form: Page 3 | Help |

Payment Method

| Which credit card would you like to use? | ○ VISA® ○ Mastercard® ○ Discover® <br> ○ American Express® ○ Check | BE SURE TO RED BACK CREDIT CARD INFO!!! If caller chooses to pay by check, be sure to tell them: We'll send an envelope for you to return your check. |
|---|---|---|
| Credit card number: | | |
| Expiration date: | [▼] / 00 [▼] | |

Installment payments:

You can spread out your gift in installments

| If yes, enter number of payments here: | 0 | BE SURE TO RED BACK CREDIT CARD INFO!!! If caller chooses to pay by check, be sure to tell them: We'll send an envelope for you to return your check. |
|---|---|---|
| Interval: | - Select One - [▼] | |
| Payment amount: | $ 0.0 (Calculated Automatically) | |

How did you hear about us?

| What station were you watching when you decided to call? | - Select One - [▼] | | You must choose from the list before completing pledge |
|---|---|---|---|

Special Information:

| Use this field if caller tells you not to exchange their name. | | DO NOT ASK: Enter Y if donor does not want name exchanged. |
|---|---|---|

Other Info:

| Comments/special instructions: | |
|---|---|
| | |

Closing

| Thanks for your pledge! Your pledge confirmation letter will arrive within 2 weeks, your gift will arrive in 4 to 6 weeks. |
|---|

*Fig. 12*

| Payment Method |
| --- |
| Phone & email are not mandatory. Format for phone is XXXXXXXXXX - no separators. WGBH does not share phone and email info. |
| Phone number: [          ] |
| Email: [    ] |

[<Back]  [Save/Continue]  [Cancel Pledge]

Project 3)     Aug 2000         Form: Page 3         Help
Pledge no. 7 _____ saved.

Enter another pledge

Return to Main Menu

*Fig. 13*

Project 1)     Summer 00     Other Call Form     Help

Mandatory Information

Date: 7/7/00
Time: 5:12 PM (Eastern Time)
Location: 1()
Agent:

Call Type   ○ Contest Entry   ⦿ Costumer Service   ○ Other   ○ Prank

*For contest entries enter name, address, and phone info. Then click save call. For customer service calls (did not receive premium from last drive, comments on programming, etc.), enter name, address, and phone info - then record message/complaint in comments and click save call. For all others, just select type (prank or other) and click save call.*

Name and Address:

Name (first, last):
Street number:
Street name:
Apartment:
City, state, zip:
Country: U.S.A.
Comments:

[Save Call]    [Cancel]

*Fig. 15*

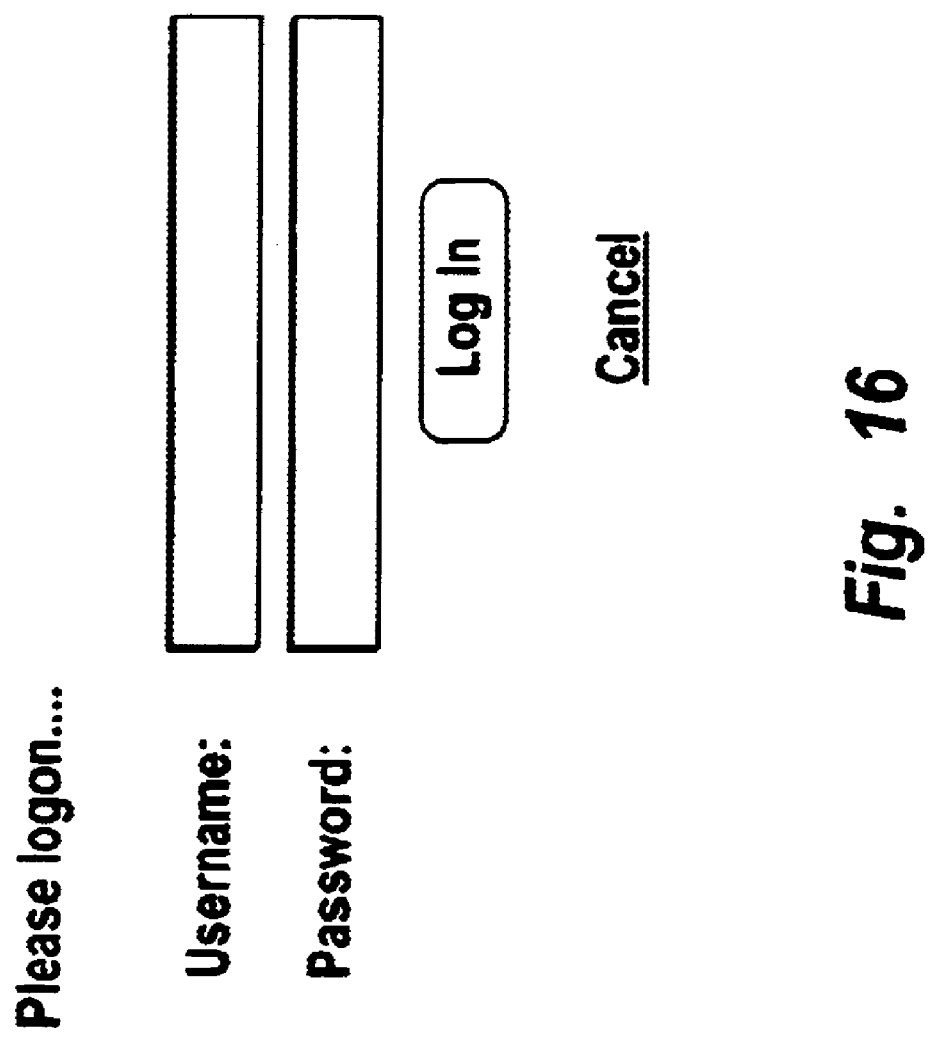

Call Agents: ～ 178

Take a pledge for your projects:

152 ⤴

| | | |
|---|---|---|
| 1) W | | Aug 2000 |
| 2) W | | Aug 2000 |
| 3) W | | Aug 2000 |
| 4) K | | Aug 2000 |
| 5) V | | Aug 2000 |
| 6) W | | Aug 2000 |
| R | | Demo |

2000

For Managers:

162 ⤴

1) W    Aug 2000: ～ 164
Download Data
Edit Show Schedule
Edit Help Screens
View Announcements View Call Reports
                               Edit Gift List
                               Edit Source Codes 2) W    Aug 2000: ～ 165
Download Data
Edit Show Schedule
Edit Help Screens
View Announcements View Call Reports
                               Edit Gift List
                               Edit Source Codes 3) W    Aug 2000: ～ 166
Download Data
Edit Show Schedule
Edit Help Screens
View Announcements View Call Reports
                               Edit Gift List
                               Edit Source Codes 4) W    Aug 2000: ～ 167
Download Data View Call Reports

*Fig. 18*

|       |                          |                   |
|-------|--------------------------|-------------------|
|       | Edit Show Schedule       | Edit Gift List    |
|       | Edit Help Screens        | Edit Source Codes |
|       | View Announcements       |                   |
| 5) W  | Aug 2000: ← 168          |                   |
|       | Download Data            | View Call Reports |
|       | Edit Show Schedule       | Edit Gift List    |
|       | Edit Help Screens        | Edit Source Codes |
|       | View Announcements       |                   |
| 6) W  | Aug 2000: ← 169          |                   |
|       | Download Data            | View Call Reports |
|       | Edit Show Schedule       | Edit Gift List    |
|       | Edit Help Screens        | Edit Source Codes |
|       | View Announcements       |                   |
| A     | Com: ← 170               |                   |
|       | Download Data            | View Call Reports |
|       | Edit Show Schedule       | Edit Gift List    |
|       | Edit Help Screens        | Edit Source Codes |
|       | View Announcements       |                   |
| D     | Documentary: ← 171       |                   |
|       | Download Data            | View Call Reports |
|       | Edit Show Schedule       | Edit Gift List    |
|       | Edit Help Screens        | Edit Source Codes |
|       | View Announcements       |                   |
| K     | March Pledge Drive: ← 172 |                  |
|       | Download Data            | View Call Reports |
|       | Edit Show Schedule       | Edit Gift List    |
|       | Edit Help Screens        | Edit Source Codes |
|       | View Announcements       |                   |
| K     | 03/00: ← 173             |                   |
|       | Download Data            | View Call Reports |
|       | Edit Show Schedule       | Edit Gift List    |
|       | Edit Help Screens        | Edit Source Codes |

*Fig. 19*

VIRTUAL CALL DISTRIBUTION SYSTEM

BACKGROUND

1. Field

The present invention relates to a system for processing in-bound telemarketing calls and extracting caller information and, in particular, to the processing of in-bound calls to extract caller information and return the caller information to a remote server through the Internet.

2. State of the Art

In-bound telemarketing refers to marketing campaigns in which an advertisement or other solicitation is broadcast or distributed to an audience of prospective donors, contributors, clients or any group from which a telephone response is desired. The advertisement or other solicitation contains a phone number for members of the audience to call in response. If someone of the audience is interested in obtaining further information, they call the telephone number with the intent of giving, buying or seeking other information. In-bound telemarketing contrasts with or differs from out-bound telemarketing where the advertiser or solicitor obtains a listing of telephone numbers and causes calls to be made to the numbers on the list. If the call is answered, the solicitor or advertiser makes their pitch for the answering party to, for example, provide funds (e.g., donate, invest) or purchase goods and/or services.

Typically, in-bound telemarketing calls are received at a single location that is populated by one or more operators each being trained to handle the calls or certain kinds of calls. If operators are not available to handle a call, the call resides in a call queue until an operator is available to handle the call. In effect the caller is placed on hold until an operator becomes available to take the call. It is also known to receive in-bound telemarketing calls at a primary location which has means for diverting them to a secondary location if the primary location cannot handle the call. Call diversion is presently accomplished in two ways. In one way, an in-bound call is answered at the primary location associated with the number in the advertisement or solicitation. If all of the operators at the primary location are busy, a switch at the primary location dials out to a secondary location. If an operator is available at the secondary location, then the operator processes the in-bound call. Multiple secondary locations can be used in some circumstances so that, for example, a busy signal leads to a second dial-out operation. Eventually, unanswered calls are queued up or stacked in a PBX device or the like until they are answered.

Calls may also be diverted from the primary location to a secondary location using various call diversion techniques provided by telecommunication carriers. In one such technique, the carrier determines whether there is an operator available at the primary location using a "busy" or "ring-no-answer" signal from the primary location. If neither is present, then the call is routed to the primary location. If either of these signals is present, the carrier diverts the in-bound call to one or more of several secondary locations using some established hierarchy.

Another technique directs a certain percentage of in-bound calls to the primary location and a certain percentage of in-bound calls to one or more secondary locations. Yet another diversion technique directs calls to a primary location and a secondary location based upon temporal information, such as the date and time. A further diversion technique involves directing calls to either a primary location or a secondary location based upon the geographical location of the in-bound telemarketing call which can be easily discerned from the area code. Obviously, the identity of the number called also may be used in any one of the systems to identify the nature of the call and the specific advertisement or other solicitation prompting the call. Although not apparent, it can be seen that in-bound call processing is limited because in-bound telemarketing calls must be handled by certain trained individuals and that call processing is not easily modified to adjust for changes that may be desired to improve the scripts being used by the operators or for new or alternate programs.

Regardless of whether an in-bound call is handled by the primary location or a secondary location, the in-bound call must be processed. In most cases, processing of an in-bound telemarketing call involves taking and recording information from the caller that relates to the advertising or solicitation. Thus it may involve the need to take information that amounts to the placing of an order for advertised goods and/or services or the making of a pledge in response to a solicitation. Information associated with in-bound calls that are processed at the primary location is typically entered or easily entered into the computer system of at the primary location. However, secondary or additional locations are typically remote from the primary location. The information to be extracted from an in-bound call is recorded manually or by computer at the secondary location. It is not unusual for the data to be recorded in such a fashion that it may not be easily used or accessed because of differing formats, computer languages, time zones and the like. In turn the call information or data is not easily assembled or is something that is not easily merged together to be suitable for transfer to the advertiser's or solicitor's computer data base. Inherent delays typically are encountered because of the time necessary to obtain and translate as necessary the incoming call data for the advertiser or solicitor.

Traditionally, information about orders and the like at secondary locations has been periodically provided to the advertiser or solicitor in paper form. More recently, the secondary locations have provided the advertisers and solicitors with access to their computer systems so that the advertiser or solicitor can remotely access the computer of the secondary location and download the data to its computer system. For this reason, advertisers and solicitors may only utilize one secondary location to process in-bound calls that cannot be handled at a primary location. Limiting a particular advertising program or solicitation to one secondary location can impact on the response or which primary locations and secondary locations are suitable. For example, for a program in which a large volume of responses is anticipated, either large primary and secondary locations must be identified or the program delayed until they are available. Thus, a program may be delayed beyond the desired time for presenting the program or the scope tailored or reduced to fit the available resources. A program that is independent of the size of individual primary and secondary locations and to process multiple programs simultaneously is desired.

SUMMARY OF THE INVENTION

The present invention is directed to a system and method for processing in-bound calls that are made in response to an advertisement or a solicitation. Specifically the system includes call receiving means for receiving a plurality of in-bound telemarketing calls. A call distribution means is connected to the call receiving means for receiving in-bound telemarketing calls and for distributing each of the in-bound telemarketing calls in accordance with a distribution protocol. That is, the call receiving means can distribute calls to call processing facilities where ever they may be based on geography and also based on availability, temporal data (date and time), language, skill group (e.g., knowledge, sales ability), subject matter and the like. Call processing means or call centers can be individuals trained or educated for the task who work at home so that the system becomes or includes a virtual call center made up of a collection of individuals each of whom are at differing locations connected through the internet.

The system also includes computer network means for communicating data between and among computer-like devices. A plurality of call processing centers are each connected to the call distribution means to receive an in-bound telemarketing call from the call distribution means. Each of the plurality of call processing centers is operable by at least one operator to answer an in-bound telemarketing call received from the call distribution means for establishing two-way communications with the caller of the in-bound telemarketing call. Each of the processing centers has process center computer means connected to the computer network to obtain a first data form therefrom. The process center computer means is adapted to be operable by an operator to visually present the operator with the first data form. The operator operates the process center computer means to record desired caller information obtained by the operator from the caller on the first data form to form a first completed data form. The operator is then able to operate the process center computer means to transmit to the computer network means the first completed data form.

The system further has server means connected to the computer network means. The server means is operable for storing the first data form and for transmitting said first data form to a first call processing center upon request from a processing center computer means. The server means is also operable for receiving and storing the first completed data form with caller data from the processing center computer means through the computer network means.

In a preferred configuration, each process center computer means is connected to the computer network means to obtain therefrom a first script. The process center computer means is operable by the operator to visually present to the operator the first script for delivery by the operator to the caller. The server means is operable for storing the first script and for supplying the first script to the computer network upon request from a call processing center computer means through the computer network means.

Desirably the system may include a master processor connected to the server means for creating and supplying the first script thereto and for suppling the first data form thereto. Preferably and alternately, the master processor is connected to the server means for creating and then suppling a plurality of scripts including the first script and wherein the master processor is connected to the server means to supply a corresponding plurality of data forms for each of the plurality of scripts.

Alternately or at the same time, the system may include a customer computer means connected to the server means for receiving caller data extracted from the first completed data form which has been received and stored by the server means. Preferably the server has customer portion connected to interface between the server means and the customer computer means. Most preferably, the customer computer means is connected to the computer network means.

In another configuration, the server includes an administrative interface portion connected to interface with the master processor. Preferably the master processor is connected to the computer network means. In a preferred configuration the administrative interface means of the server means functions to interconnect the master processor to the server means.

In some preferred arrangements, the system includes first interface means connected between the call distribution means and each of the plurality of call processors for effecting an interface there between. In some of these arrangements, the first interface means is a call distribution network and even preferably the world wide web or Internet.

In more preferred arrangements, the first call processing center includes means for receiving and processing multiple telemarketing calls at the same time.

Alternately, the system may include ISP means connected to and between the server means and the computer network means. The IPS interfaces with the computer network and the server means. Preferably the computer network means is the world wide web.

In many configurations, the process center computer means is programed to include a browser for accessing the world wide web. In addition, each server means may be programmed to include a browser for accessing the world wide web.

Alternately the first script and said first data form are integrated to provide instructions to the operator as the first data form is being filled in by the operator.

In yet another alternate, the server means is programmed to have a data base to retain the caller data of a plurality of telemarketing calls received by each of the call processing centers.

In other configurations, the system has a server means configured or programmed so that first password means limits access of the process center computer means to obtain upon request only a first script and a first data form therefrom. In yet another configuration, the server means is configured or programmed to have second password means to limit access of the customer computer means to selected data from the first completed data form.

Methods of processing in-bound telemarketing calls include providing devices as denoted above. The call distribution means is activated to distribute each in-bound telemarketing call to one or more selected call processing centers. The call processing centers are thereafter operated to receive the in-bound telemarketing call and to establish two way communications with the caller. The process center computer means is operated to call up one of a plurality of scripts and a first data form which are thereafter read and filled out to create a first completed data form. The process center computer means is operable to cause the process center computer means to send the first completed data form to the server means.

In some embodiments, the first script is a script for fund raising and the first form is a first contribution data form. In some applications, the first script and the first form are configured for the user to identify one triggering event of several triggering events that stimulated the user to place the telemarketing call. In some specific applications, the first script is for fund raising for a radio or televison channel that has presented one or more shows to promote donations. The triggering events are therefor a plurality of shows presented to promote donations.

The first script optionally provides the caller with a promotional gift selection tied to the show presented to promote donations. If there is a gift involved, the first script prompts the caller to select the first promotional gift which correlates to a selected show of said one or more shows. The first contribution data form is configured to cause the first promotional gift to be identified to the operator upon identification of a correlated selected show.

In a most preferred arrangement, a master processor is provided and connected to the server means as herein before stated. The master processor is operated to supply a plurality of scripts including the first script thereto and for suppling a plurality of data forms including the first data form thereto. A customer computer means may also be provided and connected to the server means. It is operated to extract caller information there from.

Optimally, there is defined a method for processing in-bound telemarketing calls to receive pledges for an entity having presented a plurality of find raising events.

BRIEF DESCRIPTION OF THE DRAWINGS

In the drawings which illustrate embodiments suitable to illustrate the present invention:

FIGS. 10–13 are the pages of a pledge form to be filled in by an operator of a call processing center of the present invention;

FIG. 15 is a data form to be filled in following the script of FIG. 14;

FIG. 16 is a log in page to be used by a user to access the server of a system of the invention;

FIGS. 18–20 are a table-like representation of a menu showing the features and function for different processors and for different projects;

DETAILED DESCRIPTION

Telemarketing or marketing by telephone has grown in importance with many variations now being embraced to effect sales of goods and services as well as to fund raise for various political reasons and for various eleemosynary purposes. In some cases, sales are stimulated by mailings in the form of promotions or catalogs each presenting a phone number for a customer or potential customer to call to place orders. Similarly, sales may be stimulated by infomercials (lengthy story-like sales promotions) or commercials which also present the customer or potential customer with a telephone number to call for placing orders. For some fund raising, particularly for public television and radio, specific programs are presented or aired at selected times as part of a promotional effort to stimulate viewers to make contributions or make pledges to support the involved station or public television system.

To process the incoming or in-bound telephone calls that are responsive to particular advertising programs or solicitations, systems have been devised to receive the calls and queue them for processing in some logical sequence typically on a first-call-first-answered basis. Banks of operators have been provided in some cases all at the same or nearby locations so that distribution of calls is easy and collection of information from the operators after one or more calls are completed can be more easily effected.

The present invention provides a system that appears to be a virtual (but not actual) single location to process in-bound telemarketing calls originating as a result of multiple advertisements and/or multiple solicitations and/or multiple fund raising programs originated by public television and radio. Indeed, the system may include one or more individuals working at home who are obviously not physically located at a central location. Nonetheless, the system appears to be a single location by managing multiple projects, multiple inputs and by processing data to and from a server using conventional browser programs over a network such as the Internet or world wide web. In other words, the system is managed so that it appears to the caller to be a single location even though calls are directed to or answered at diverse locations that may be geographically distant (e.g., Bangor, Maine to San Diego, Calif.).

Figure 1:
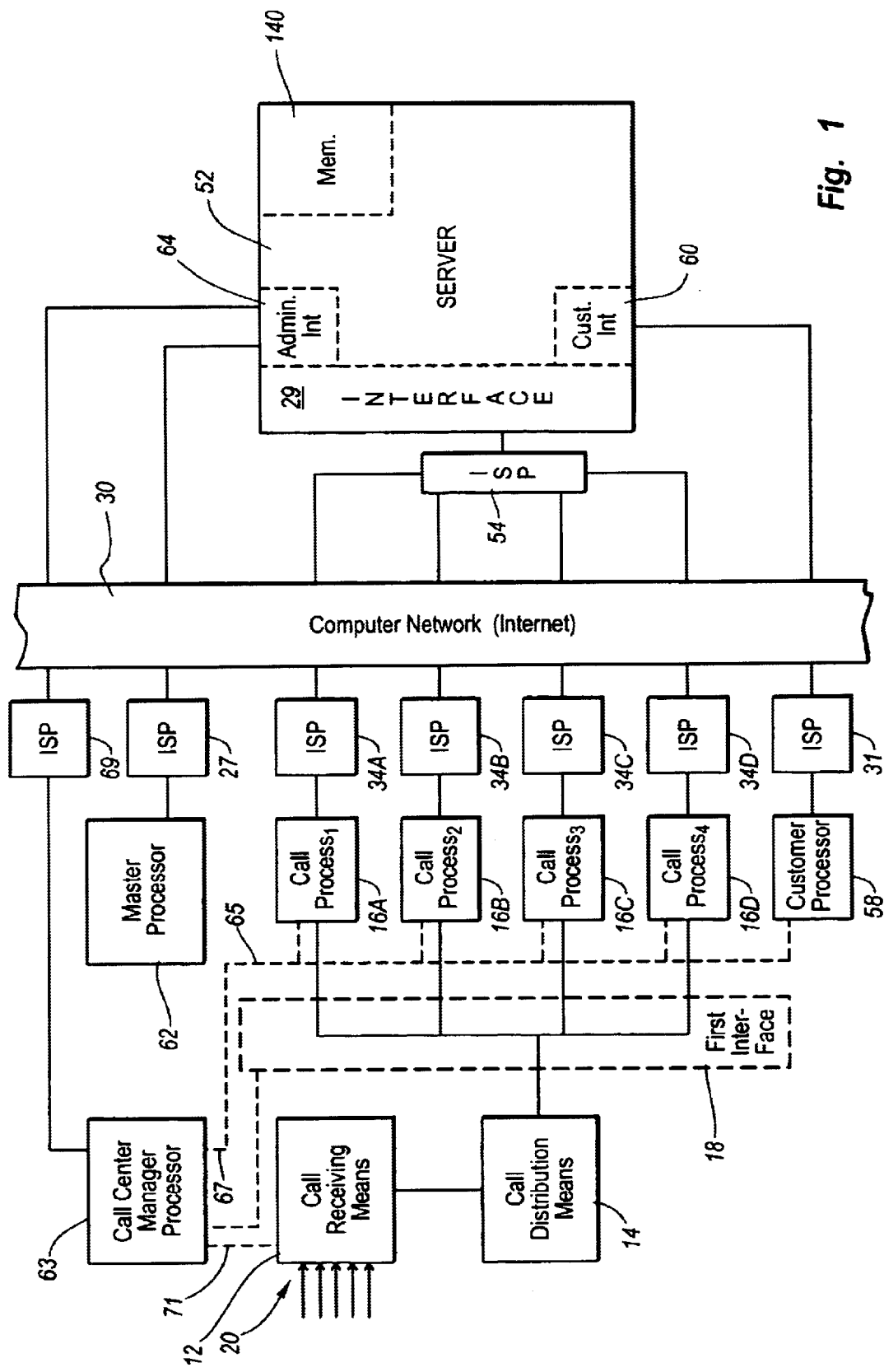
FIG. 1 is a block diagram of a basic system of the present invention.

In FIG. 1, a call processing system 10 is shown in block diagram with a call receiving means 12 connected to supply in-bound calls 20 to a call distribution means 14. The call receiving means 12 and the call distribution means 14 may be assembled as a single device but are here show separate to illustrate the two separate functions. The call receiving means 12 is any suitable device configured to receive calls on numerous lines and to hold them pending transfer to a device that will distribute the call. The call receiving means 12 is sometimes configured to in fact answer the call and provide the user with a pre-prepared message confirming that the caller has reached the desired entity (tied to the phone number called) and that the call will be processed in a particular way. Background music and promotional information may be provided after the initial message. Any number of commercially available automatic PBX devices may be adapted or suitable for this purpose. Such systems can be obtained, for example, from LUCENT Technologies which is, of course, a nationwide distributor of telephone equipment. Notably, the in-bound call may be a direct call if it is received directly from the caller; or the in-bound call could be a call redirected from another location.

The call distribution means 14 as here used is any suitable system for distributing a volume of incoming calls to one or more locations for answering and two-way communications. A call distribution means is a system that has the ability to route each incoming call to any one of a plurality of call processing centers$_{1\ to\ n}$ ton such as centers 16A, 16B, 16C and 16D. The call processing centers are denominated with the subscripts 1 to n to depict that the number of them is variable and may be from one (with n equal to zero) to any desired plurality. Only four (4) call processing centers 16A–D are shown here simply for convenience even though many (e.g., from 2 to several hundred) may be used.

As depicted in FIG. 1, the call distribution system 14 distributes the calls by first interface means 18 which can be conventional phone lines including a series of 800 numbers to be accessed by interface means which is a call placing device of any suitable form. Alternately, the call distribution system 14 can distribute calls through a PBX or the like to several locations within a single building or complex. Still alternately, the call distributions system 14 can distribute calls to call processing centers 16A–D over the Internet. That is, the first interface means 18 can be the Internet. Alternately, calls may be transferred by a telecommunication network from the call distribution means 14 to the call processing centers 16A–D in any number of forms. For instance, the telecommunication network can be comprised of satellite, cellular, packet switched, optical and conventional wired communication systems or combinations thereof.

The call distribution system 14 may be configured to distribute the in-bound calls 20 in accordance with a call distribution protocol. That is, a particular advertising program or solicitation may be best handled by directing incoming calls to a call processing center like call processing center 16A because it is in a particular geographic location. Alternately, calls may be directed to certain or selected call processing centers at certain times of the day or night based on time zone and time of day. For example, calls in Los Angeles at 5 AM would be better dealt with by a call processing center 16A–D in the eastern time zone where it would be 8 AM. Similarly a 3 AM call in New York City would be better processed by a call processing center 16A–D in California because it would be midnight. Further calls, may be distributed based on the nature of the incoming calls determined by the called phone number. Certainly, other criteria may be devised or selected depending on circumstances.

The goal of the protocol is to distribute all or as many of the calls as possible to call centers that can process the calls. As a consequence, the rules are typically designed to address the anticipated pattern of calls. For example, if a public broadcasting station is running a fund raising drive that involves showing a feature documentary with fifteen minute breaks once every hour to request pledges or to auction items, there is likely to be a large number of in-bound calls that need to be processed during the breaks. In such a case, a number of call centers might be utilized and the calls assigned to the call centers in a round-robin fashion in an attempt to maximize the number of in-bound calls that are processed and in turn maximize the number of pledges. More or less sophisticated rules are possible depending on the particular situation, including the relevant constraints and/or goals. Other call distribution devices are feasible provided they are capable of receiving in-bound calls and distributing the calls to the call centers in a group of call centers. It should also be noted that a call processing center may have the ability to receive and process more than one call at a time.

Figure 2:
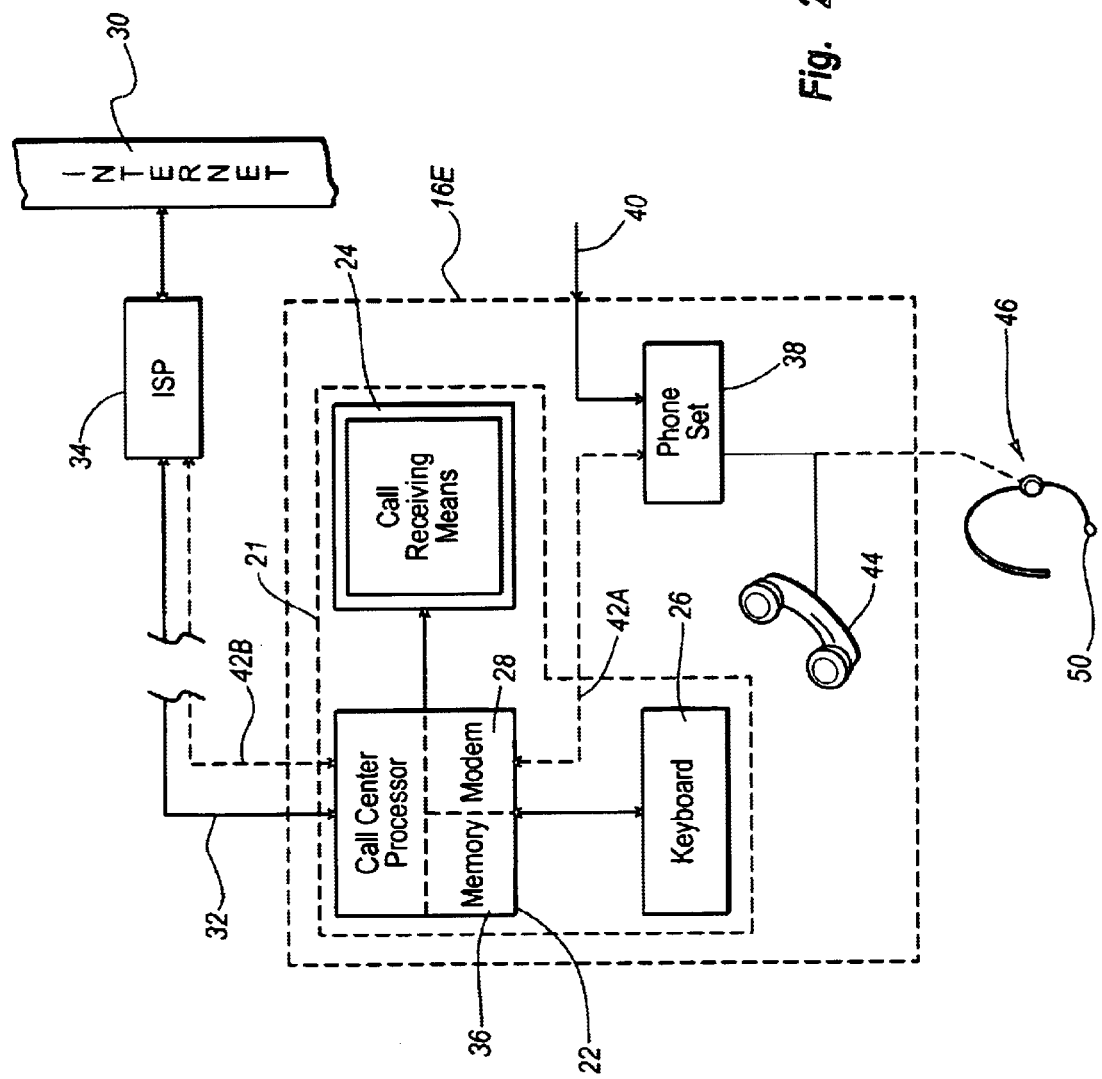
FIG. 2 is a block diagram depicting the components of a call processing center.

In FIG. 2, a typical call processing center 16E is depicted in a type of block diagram format. The call processing center 16E is substantially identical to the call processing centers 16A–D. Essentially, the call processing center 16E has a call center computer means 21 consisting of a call center processor 22 interconnected with a visual display device such as a CRT 24 and a typical input device like the keyboard 26. The call center processor 22 has a modem 28 configured to access the internet 30 by telephone line 32 through an Internet service provider 34 (FIGS. 1, 34A to 34D). The call center processor 22 also has a memory 36 and is programmed with an Internet browser to provide the user with ready and easy access to Internet servers or terminals at different locations.

The call processing center 16E of FIG. 2 has a phone set 38 which is connected to receive an in-bound call 20 that has been routed to it by the call distribution means 14 via telephone lines such as line 40 or via the internet 30 via lines 42A and 42B which are shown as dotted lines to show they are an alternative and not the standard: telephone connections and systems now in place. An operator is trained to operate the phone set 38 and receive one of the in-bound calls 20 and establish two-way telephone communications with the person making the in-bound telemarketing call who is referred to from time to time herein as the caller. The operator also is trained to operate the key board 26 and the computer itself to obtain information for communication to callers and to record information obtained from the caller. Presently, the operators at a call center are humans but automated operators are also feasible.

It may be noted that the phone set 38 is shown with a standard hand held receiver 44. Clearly a hand held receiver is most likely not used so that an operator may keep his or her hands free. However the hand set 38 represents any device that can be used by the operator to answer calls and communicate with the caller. In most cases, it would be preferable to use any one of a wide variety of head sets like a simplified version 46 shown in FIG. 2 that has an ear piece 48 held in place proximate the ear and a mouth piece 50 or throat piece positioned to intercept words spoken by the operator.

Returning to FIG. 1, the call processing centers 16A–D are shown connected to the internet 30 by the Internet service providers 34A to 34D to receive scripts and data forms and to supply completed data forms all as hereinafter discussed. server 52 in FIG. 1 is shown connected to the internet 30 through an internet service provider 54 from an interface portion 29 which is configured with a plurality of ports so that the server 52 may simultaneously supply scripts and data forms and receive completed data forms from the several call processing centers like call processing centers 16A–D. As shown, the server 52 is connected to the internet 30 through ISP 54 which includes a plurality of web transfer devices so that the server 52 may be accessed by each call processor 16A–D directly independent of the other call processing centers. In other words, the server 52 is configured to be in simultaneous communication with each operating call processing center so that each call process center 16A–D can access the server 52 and to obtain forms from it or to transmit forms to it.

In FIG. 1, a customer processor 58 is connected either directly to the server (not shown) or through the internet 30 via an ISP to a customer interface portion 60 (e.g., a type of buffer) of the server 52, a port or the like. The customer processor 58 is any typical computer-type device that allows a user to communicate directly or through the Internet service provider (ISP) 31 with the internet 30 using any one of several available web browsers programmed into the customer processor 58. A standard PC with a screen and keyboard with a built in modem is certainly suitable. The customer processor 58 is operated by the customer to access data obtained by and stored in the server 52 as hereinafter detailed.

A master processor 62 is connected either directly to the server 52 or through an ISP 27 to the internet 30 and then to the server 52. That is, the master processor 62 is any suitable computer type device such as one of the wide range of available Personal Computers (PC) having sufficient capability. If the master processor 62 is located at a remote location and connected to the server 52 thorough the internet 30, the intermediate service provider 27 is interconnected between the master processor 62 and the internet 30. Also, an administrative interface 64 (e.g., a buffer or port connected)is provided to connect the master processor 62 with the server 52.

A call center manage 63 is also depicted in FIG. 1. The call center manager 63 has a processor that allows access to the server 53 through the internet 30 and the administrative interface 64. The call center manager 63 is also optionally configured with access 65 to each of the call processing centers 16A–D and more specifically the processor of one or more call agents to be able to observe real time data entry as the call agent is filling out a data form. Similarly the call center manager 63 may be configured with a connection 71 so that incoming calls to a call processing center 16A–D can be monitored in a supervisory capacity. Such a connection may be made separately through the call receiving means 12 as shown or alternately to the call distribution means 14.

Figure 3:
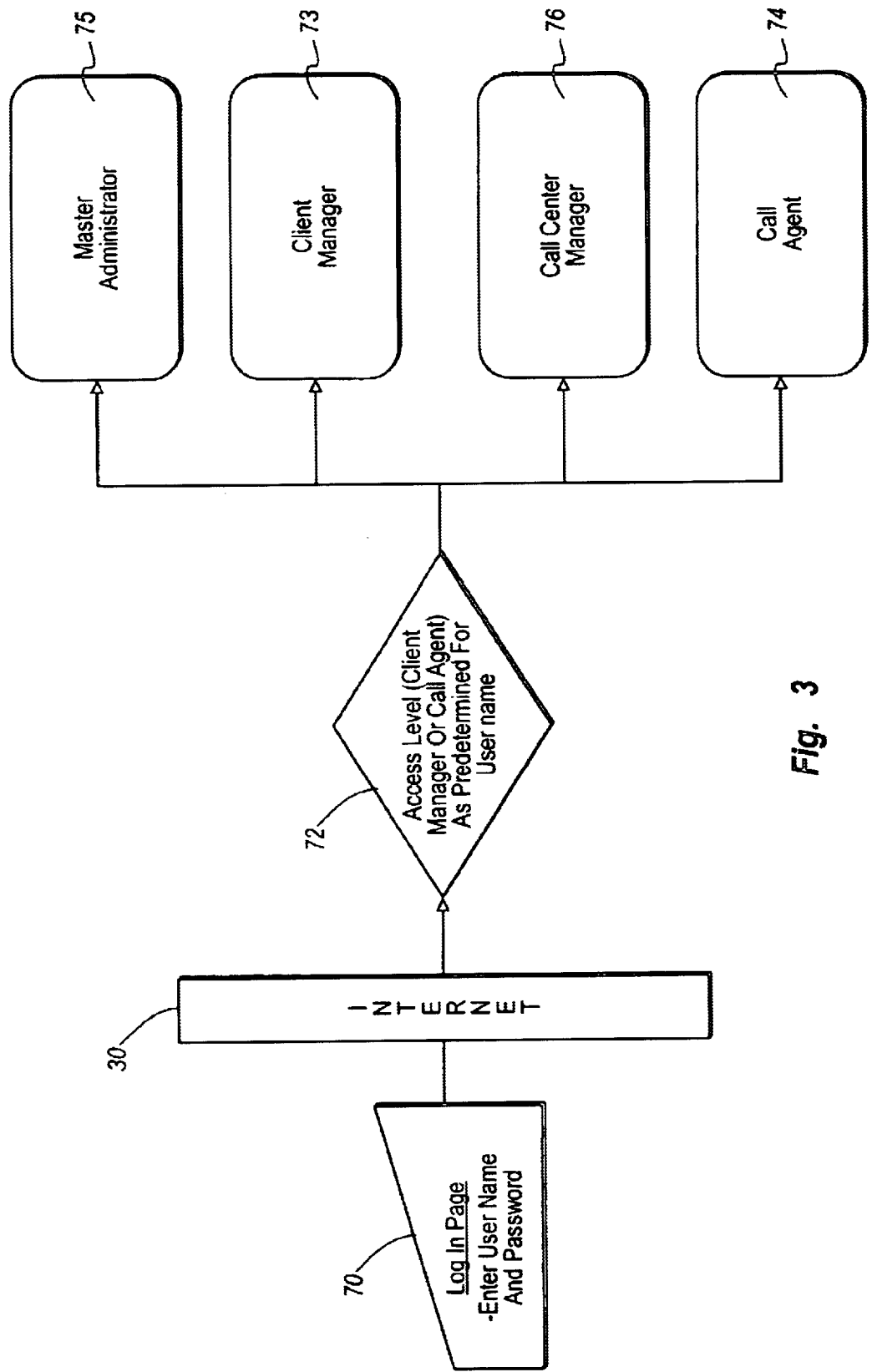
FIG. 3 is a simplified architectural depiction of the software functions of the system of the present invention.

FIG. 3 is a simplified diagram of the system depicting the fact that a user or operator of the system 10 operates his or her computer to access the server 52 of FIG. 1. The user may be the operator of a computer which may be the process center computer means 21, the customer processor 58 or the master processor 62. Each has a browser that can be operated to present a log-in page 70 which the operator fills in and transmits through the internet 30 to the server 52 (FIG. 1). The log-in page 70 is quite simple and is illustrated in FIG. 16. The log in page requires the user to enter information that may be regarded as a password which the server 52 recognizes to allow the user to attain a preset level of access to the server 52 and in particular to the server programming and documents. Thus the customer or client manager 73 is given access 72 to data stored in the server 52 that has been collected by the operators of the call processing centers 16A–D. However the operators or call agents 74 of the call processing centers 16A–D are limited so that only a desired script and only a desired data form can be accessed and downloaded to the process center computer means 21. The system or master administrator 75 operates the master processor 62 and in turn has access to all of the programming and data contents of the server 52. A call center manager 76 may also be provided access to manage the call center. Multiple call center managers may be provided in some systems if desired.

Figure 4:
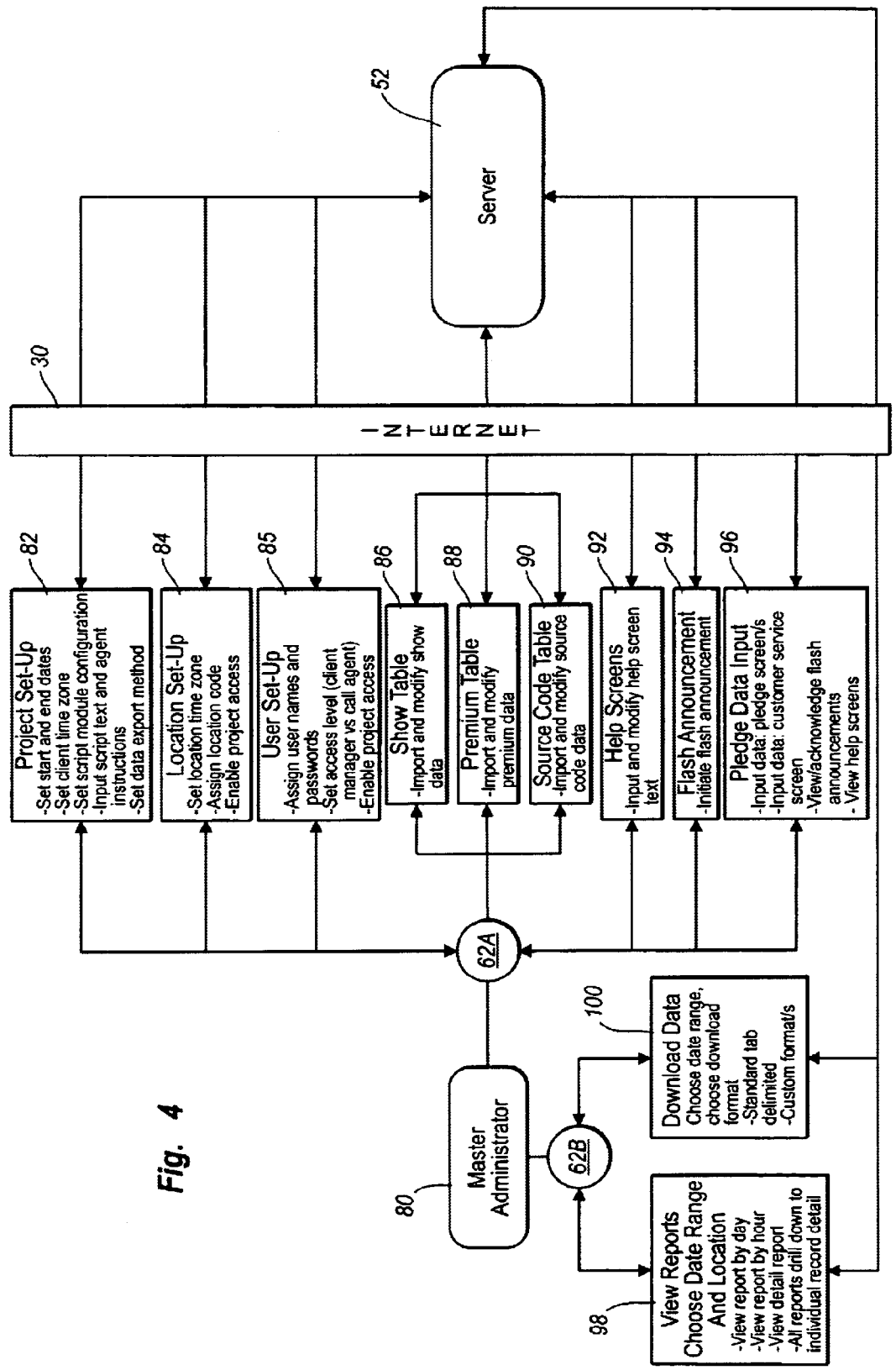
FIG. 4 is a simplified architectural depiction of the software functions associated with a master processor for use in the present invention.

FIG. 4 depicts the features and functions available to the master or system administrator. The processor 62 for the system or master administrator may be connected directly to the server 52. However it may also be located at a remote location and connect to the server 52 through the internet 30. In FIG. 4, the master administrator 80 operates through the master processor 62A and 62B to perform any one of multiple functions. The administrator 80 may select PROJECT SET UP and enter data instructions and parameters as detailed. Similarly, the master administrator 80 may select LOCATION SET UP 82 and USER SET UP 84 and enter data or make selections as appropriate. For a solicitation seeking funds for a radio or TV station having shows, the master administrator 80 may also access the SHOW TABLE 86 to enter information about one or more fund raising activities which can be radio or TV shows. Similarly, the master administrator 80 may access the PREMIUM TABLE 88 to show or list the various prizes or gifts to be sent to the donors upon reaching certain thresholds (level of contributions). The master administrator 80 also may access the SOURCE CODE TABLE 90 which seeks to correlate the data about the source of the show as shown. For example, the soles call data can be correlated to a program, a portion of a program, or a specific solicitation. The master administrator 80 may also provide detail for the HELP SCREENS 92. A FLASH ANNOUNCEMENT capability has also been added so that the MASTER ADMINISTRATOR is able to put a message in front of one or all operators to make final adjustments and to correct an error and to otherwise communicate during system operation.

For each project to be undertaken by the system, a PLEDGE DATA INPUT form 96 is designed to collect the desired and necessary information from the caller. Although a pledge is obtained for those programs that solicit funds, it should be understood that a data form can be devised for taking orders for merchandise and services as well as for other kinds of programs that involve the payment of funds and/or information requests.

As depicted in FIG. 4, all of the various features and functions are transmitted by the master administrator 80 by his or her processor 62 through the master processor 62A and 62B to the internet 30 and then to the server 52. The master administrator 80 may be able to control the VIEW REPORTS 98 function through the master processor 62B by designing and devising reports which can be checked by downloading them in the DOWNLOAD DATA 100 process for review after the project has been in operation or at the end of the operation. However, in the embodiment here illustrated, the reports are not changeable except through changes of the core code of the system itself. The master administrator 80 has complete access to the server 52 and in particular to its memory and its programs to modify or amend any form or format loaded by the master administrator 80 and to evaluate data deposited thereafter.

Figure 5:
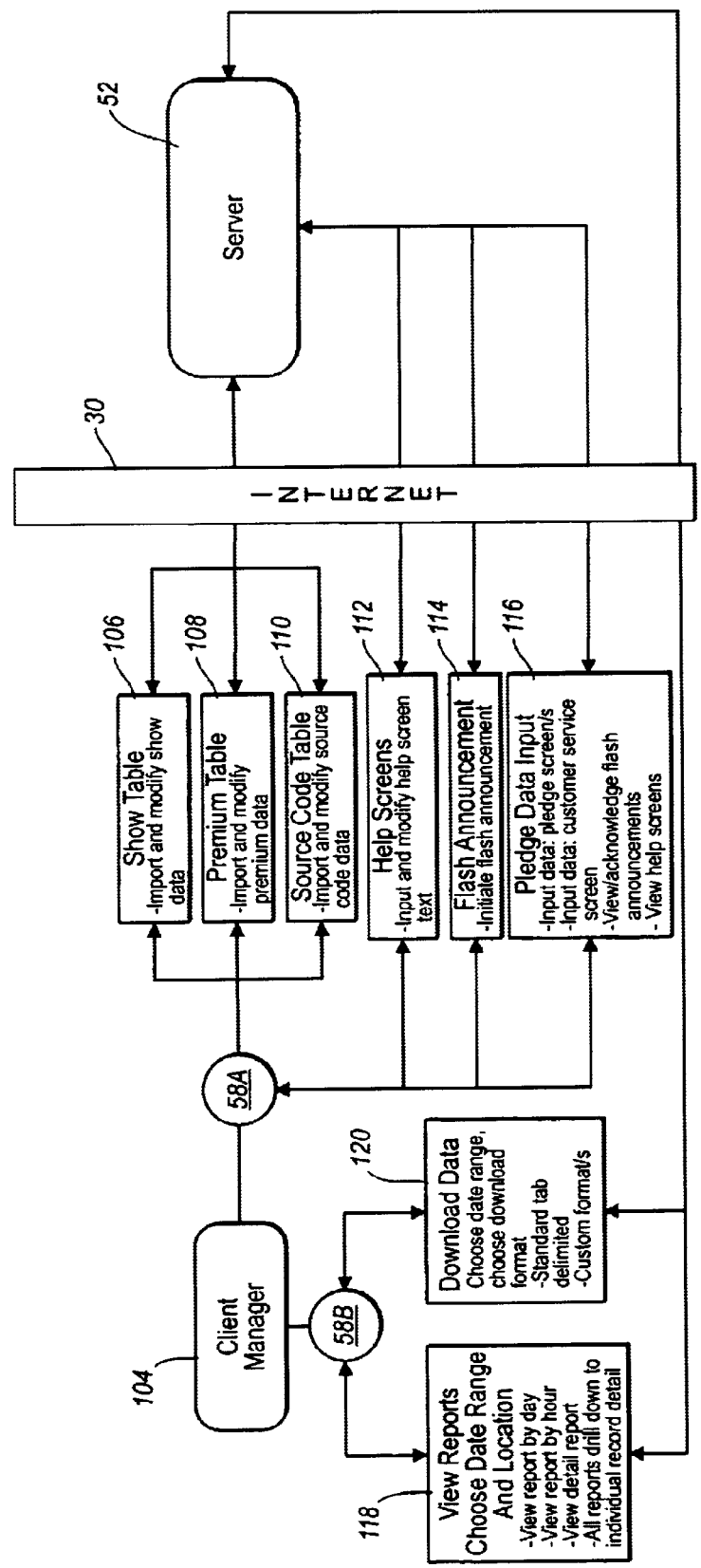
FIG. 5 is a simplified architectural depiction of the software functions associated with a customer processor for use in the present invention.

In FIG. 5, the various functions and features available to a client manager or customer 104 are depicted. Specifically the customer 104 is shown after being allowed real time access through the customer processor 58A and 58B with an ability to access data in any of several formats including three different kinds of tables 106, 108 and 110. Of course the server 52 may be programed to provide the data in any desired graphical or tabular format that may be desired. The client manager or customer 102 is also allowed access to send FLASH ANNOUNCEMENTS 112, modify HELP SCREENS 114 and access the show table 106, and premium table 108 as well as the source code tables 110. Also a client manager or customer 102 may act like a call center and take calls and enter data using a first form and a first script and submit the data forms through the PLEDGE DATA INPUT feature 116. The client manager or customer 104 is also able to access individual data (e.g., the first completed first form) as well as the desired reports through the customer processor 58B through the VIEW REPORTS function 118 and view the results of the system operation through the DOWNLOAD DATA function 120.

Figure 6:
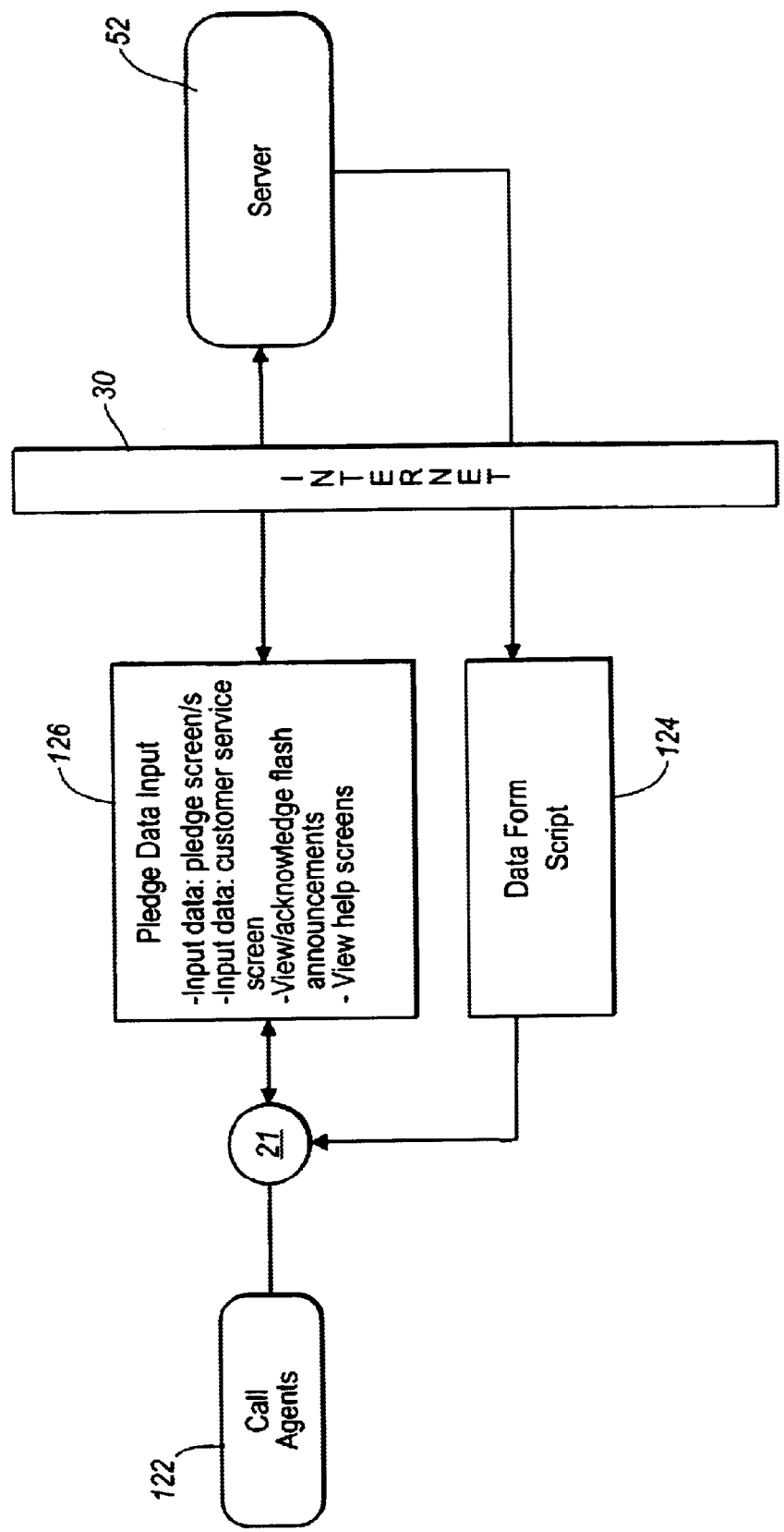
FIG. 6 is a simplified architectural depiction of the software functions associated with a process center computer for use in the present invention.

The operator at a call processing center like the call processing center 16E and call processing centers 16A–D may also be referred to as a call agent who has only limited access to the server 52. Specifically the call agent 122 is depicted in FIG. 6 with a connection through the processing center computer means 21 with the ability to ask the server 52 to provide a desired data form and a desired script 124 which are received and used by the operator or call agent 122. After the script and data form are received, it may be used over and over again. The data form and the script are typically put together or integrated and may be regarded as the first data form and first script. Once loaded into the processing center computer means 21, they may also be used over and over again. Upon answering an in-bound call, the operator or call agent 122 takes steps to cause the data form to be filled in following the incorporated script so that when it is filled in, it becomes a first completed data form. Thereafter, the PLEDGE DATA INPUT 126 is accessed and the first completed data form is transmitted to the server 52 through the network 52.

Figure 17:
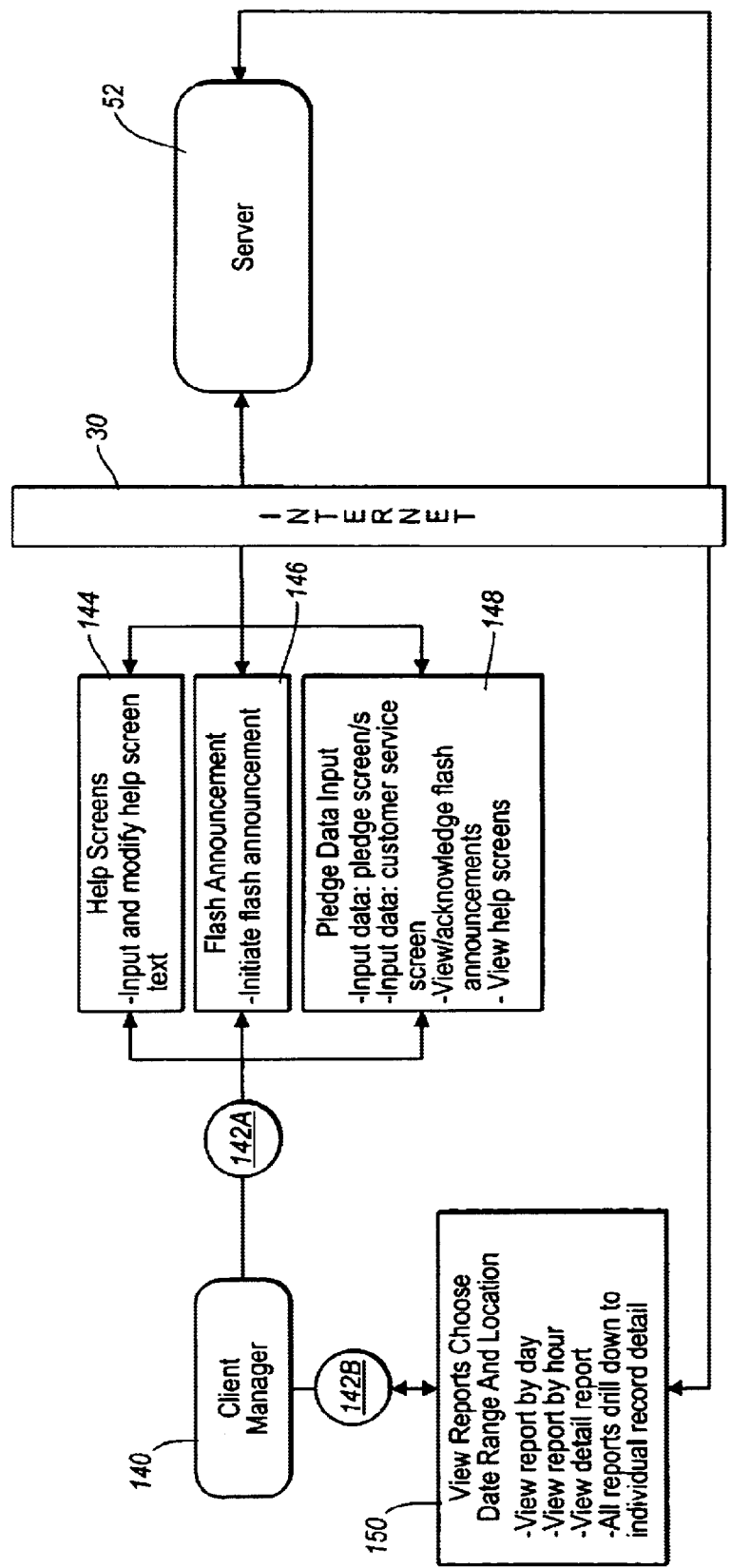
FIG. 17 is a simplified architectural depiction of the software functions associated with a call center manager processor for use in the present invention.

FIG. 17 the call center manager 140 is illustrated with a connection through a call center processor 142A and 142B to access the help screens 144, the flash announcement feature 146 and pledge data input screens 148 so that the call center manager 140 may in fact take a call and act as a call agent 122 (FIG. 6). The call center manager 140 may also view reports 150 obtained from the server 52 all through the internet. Thus the call center manager 140 is provided with the ability to manage the call center by use of flash messages, modify help screens, and test and use the pledge data input 148 while viewing reports to monitor volume and similar information.

Figure 20:
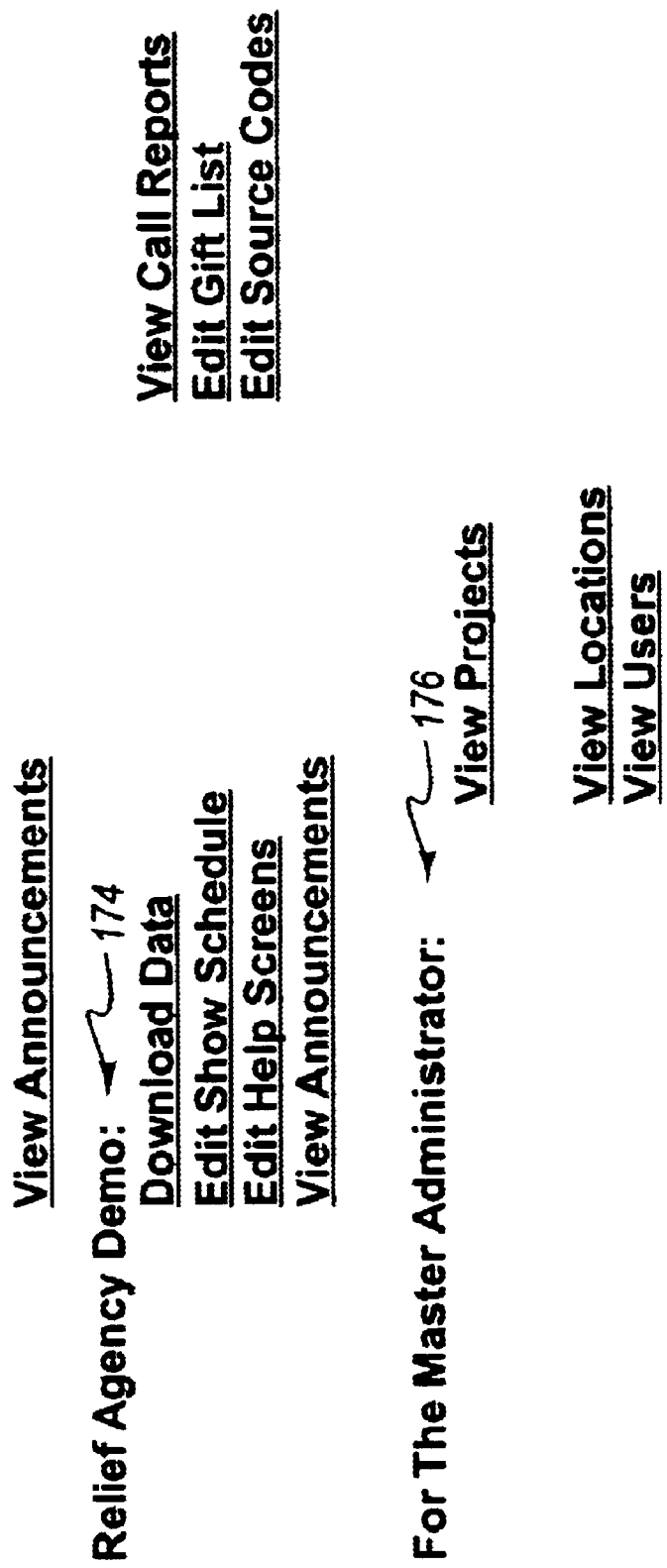
Figure 21:
FIG. 21 is a depiction of the selection of functions by a master administrator in a system of the present invention.

In FIGS. 18, 19 and 20, the main menu is depicted in a table-like format to illustrate the features that have been created for each project by the master administrator. That is, each project 164–174 is configured by the master administrator to have desired features. FIG. 18 shows that a call center manager 162 has access to the projects to observe the content of the various stated menu of features or functions as well as to the content of the scripts and data forms and the ability to select for each call agent by enabling that;call agent to access selected or all scripts and data forms; but typically each call agent is elected by the master administrator 75 or call center manager 76 (FIG. 3) to access only the scripts and data forms for projects 152 specifically identified for that call agent. Thus, in FIG. 21, we see that a the master administrator 75 or call center manager 76 (FIG. 3) edits or selects the projects 154 by selecting an edit screen as depicted. The master administrator 75 or call center manager 76 (FIG. 3) then checks one or more of several projects or programs for which that agent is to take calls. As shown the call agent here is being enabled to take calls for several projects 156–160.

The manager function 162 in FIGS. 18–20 is depicted for the call center manager 76. The master administrator 176 in FIG. 20 has all the capability of the master administrator 75 of FIG. 3 and in turn can access all the various features and functions with the ability to select, change or reconfigure as desired. As stated, the master administrator 176 can access all that which the call agents 178 and the call center managers 162 can access.

Figure 7:
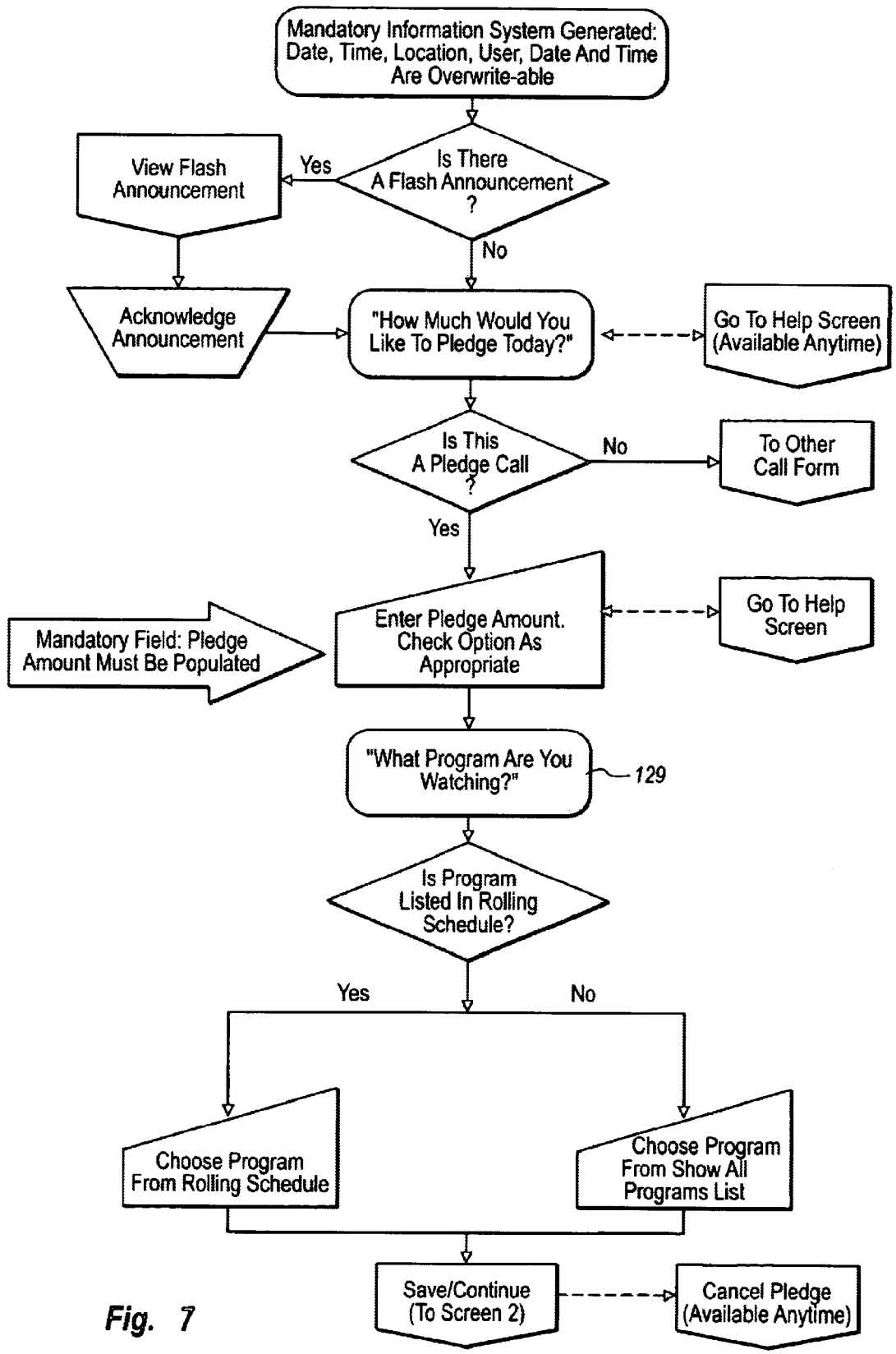
FIGS. 7–9 are schematic script diagrams showing the steps in a data form to be filled in by an operator at a call processing center of the present invention.
Figure 8:
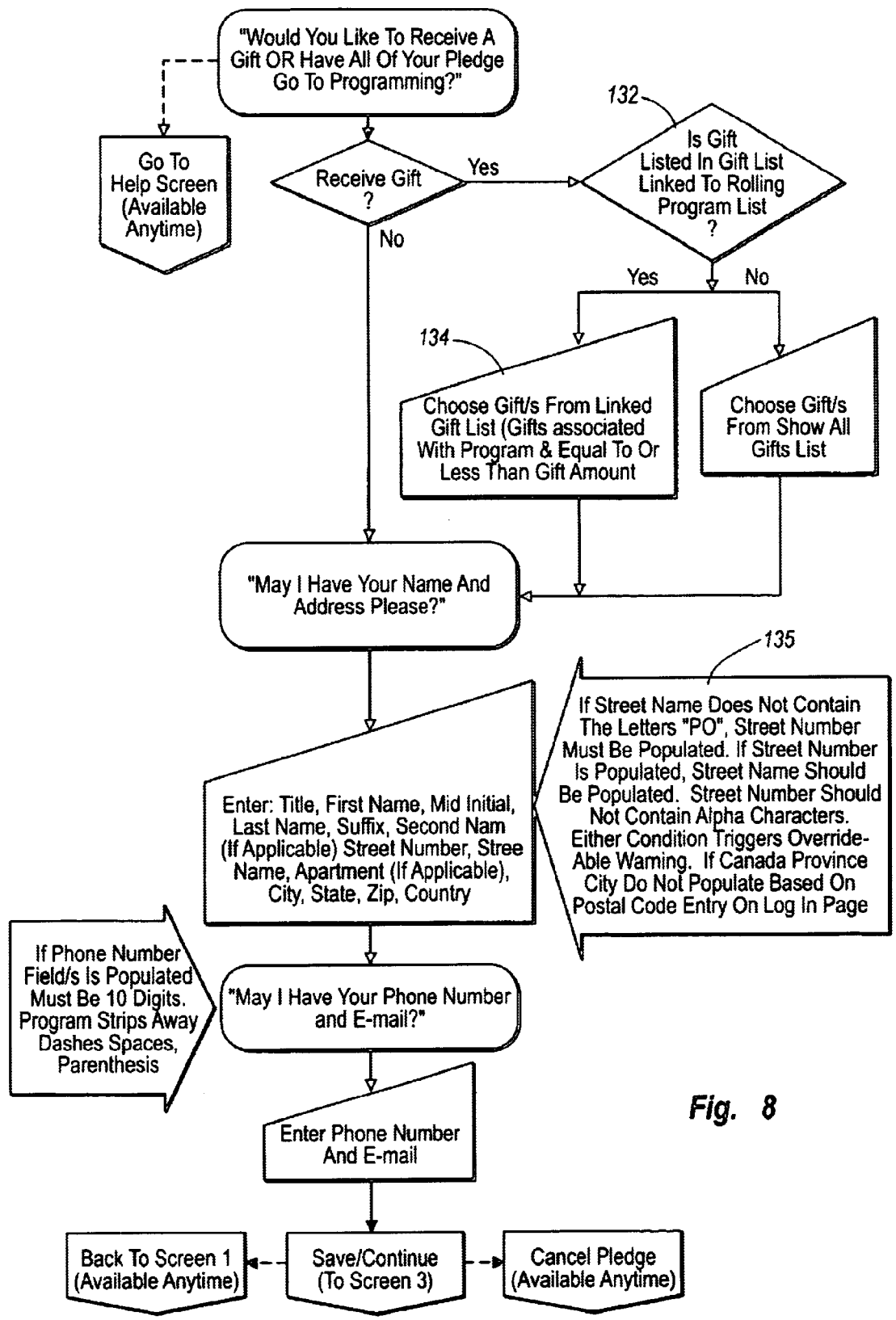
Figure 9:
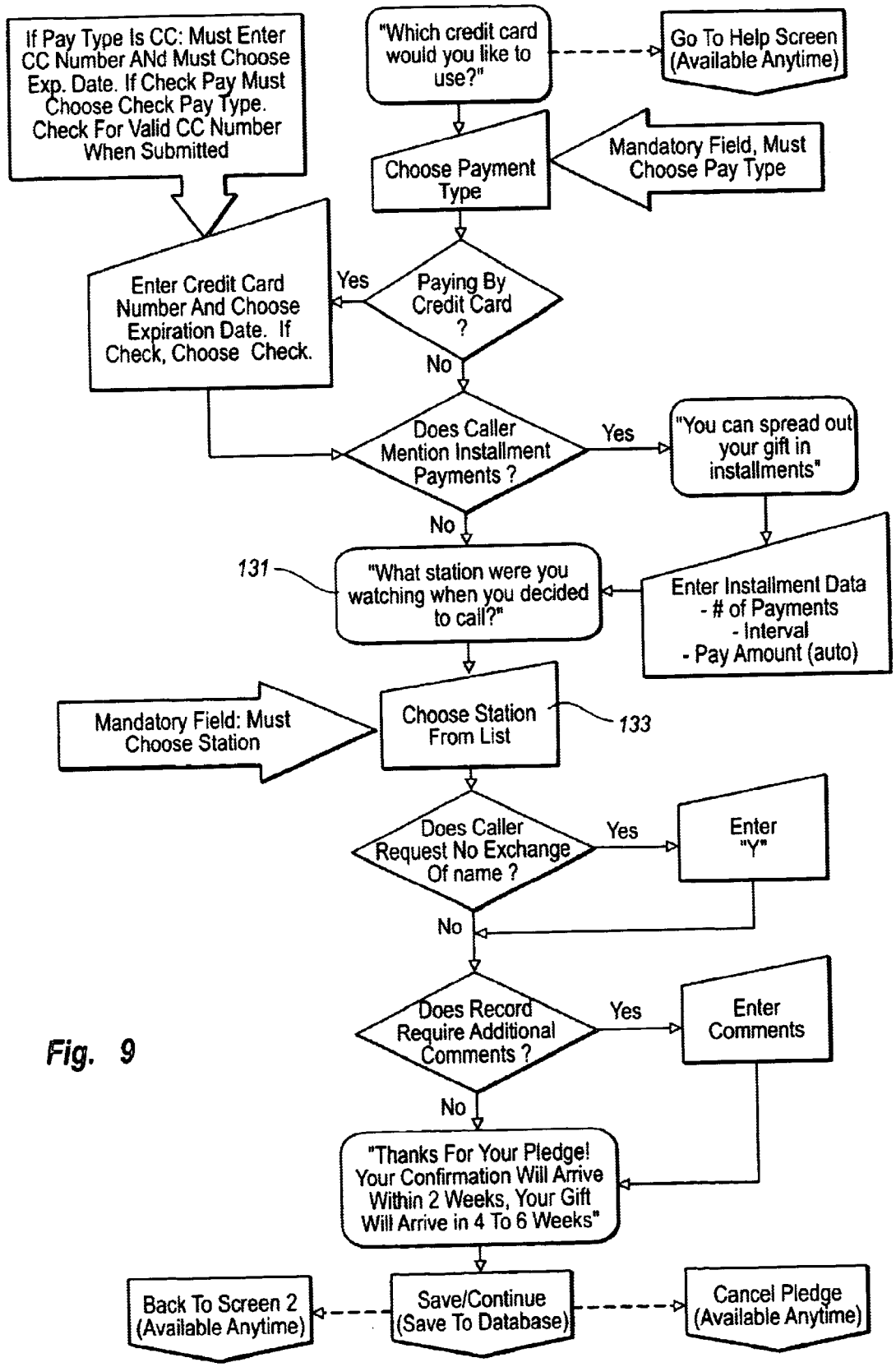

Turning now to FIGS. 7–9, a script and flow logic are shown together for the associated data form (FIGS. 10–12). The graphical flow diagram of FIGS. 7–9 depicts what information the user (e.g., the agent taking calls) is to obtain (in this instance what he must do and what options exist at each step for a program that is a solicitation for a TV or radio station). FIG. 7 depicts the first screen the operator would call up with FIG. 8 being the second and FIG. 9 being the third. In FIG. 7, the caller is required to identify a program or show 129 that was being watched to prompt the gift. Near the top of FIG. 8, there is a step 130 depicted by which the operator seeks information about the desire for a gift. The gift is tied to the show that was identified in response to the question at block 129. If the answer is yes, it can be seen that the program diverts to a rolling list of gifts 132 which are set based on the level of contribution. The rolling list identifies all those gifts that are for the contribution or pledge given and for lesser contributions or pledges 134 and connected to the program identified by the caller as the reason for the call.

In reference to FIG. 9, block 131 and block 133 show that the caller is asked to identify the station that has been presenting the fund raising program. For solicitations and promotions that do not involve a radio or television station, one can see that the system administrator could easily ask the caller to identify other information that may be of interest such as the advertisement seen, the involved newspaper or magazine, or the like.

Figure 22:
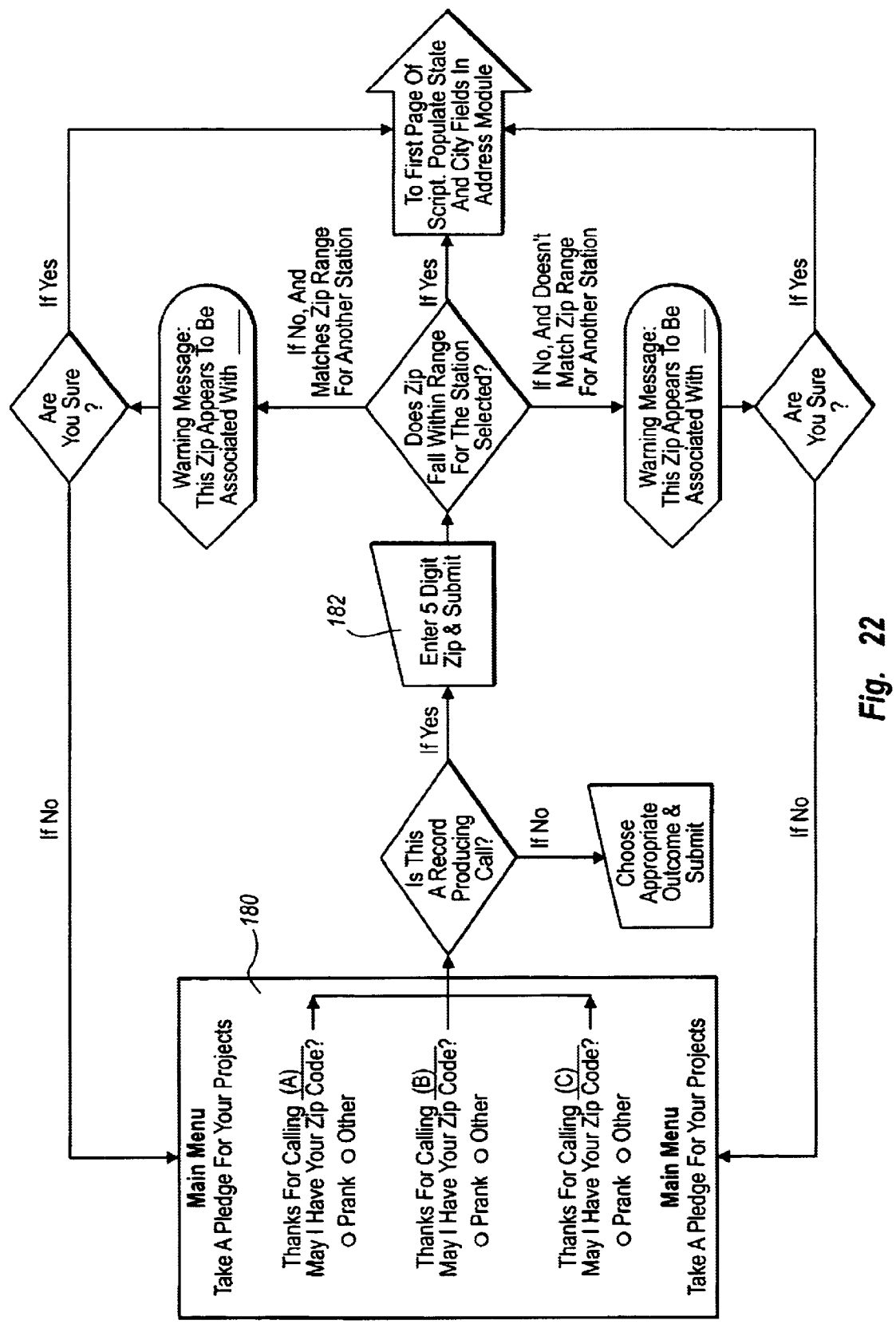
FIG. 22 is a flow diagram of a zip code verification system for use with the present invention.

In one variation, the flow logic of the script of FIG. 7 may be modified to have a zip code verification step better seen in FIG. 22. In operations involving multiple projects with similar identifiers or names such as with radio stations, a zip code check can be selected to reduce errors. For example, a call agent may inadvertently enter the call sign of the wrong radio station thereby creating confusion because the pledge is credited to an entity different from that desired by the pledgor. Inasmuch as many projects have a geographic range, a zip code check may be effected. For example, a public radio station in Oregon would be expected to receive pledges only from a specific number of postal zip codes for those postal zones within the broadcast area. Thus early identification of the postal zip code can ensure that the correct data form is being used and that the correct script is being used.

FIG. 22 shows a a zip code check system with a logic or menu outline configured for a plurality of projects for radio and TV stations that all have a four letter call sign. The call agent thanks the user for calling and determines if the caller wishes to make a pledge. The call agent then asks the user for the four letter call sign 180 and enters the four letter call sign in a data form. The call agent then asks for the zip code 182. Upon entry the zip code may thereafter be automatically entered where ever else the zip code is needed in the form. The zip code also is processed through a sub routine to make sure it compares to the broadcast area of that station. This can be effected by transmitting the zip code over the internet to the server where the comparison is to be made. Alternately, the system can be configured for the comparison to be made in the processor of the call agent. If the postal zip code does not match the calling area of the station identified by the call sign, the call agent is given a warning message that asks him or her to prompt the user to verify the four letter call sign. Since calls can be received from far out of area from time to time, the call agent may nonetheless proceed on if the caller confirms the station letters. However, the call agent may correct the station call letters if there were incorrectly given or incorrectly entered. Of course the same confirmation by zip code can be effected for any any other project that has a regional connection or relationship.

In a similar fashion, FIG. 8 shows use of an optional routine with reference to the caller's address information. If a Post Office or "PO" box is not entered, then the street number must be present. IF there are only alphabetical letters for the street number a warning may be generated FIGS. 10–13 is the data form that appears in blank on the operator's screen of the process center computer means 121 (FIG. 2). The form is configured so that it can be filled in by the operator as the operator is talking to the caller and asking the caller for the information. The operator may ask the questions consistent with a planned script which has been incorporated into the form and which provides roll out options for the operator to choose items consistent with the answers provided by the caller. Thus the script is not separate but rather incorporated into or with the form which seeks simply the data or answers. Alternately, the operator may fill in a form in accordance with or pursuant to a separate script which is printed out and in front of the operator. Alternately the computer means 21 of the call processing center can be programed to provide the operator with a split screen with the form on one half and a separate script on the other. FIGS. 10–13 present a combination form in which the script and the form have been incorporated into one.

To speed up the form filling-in process, the date, time, location and name of the call agent or operator are all automatically filled in by the computer means 21. The form of FIGS. 10–13 continues from page to page following in effect the script that has been incorporated into the form. Once the operator or call agent has filled out the form like the form of FIGS. 10–13, he or she forwards the filled-in form as a completed data form directly to the server 52 via the internet 30. FIG. 13 depicts the fact that a particular data form when completed is sent back to the server 52 by "saving" which is then followed by another screen which can be any desired form or format that prompts the call agent to enter another pledge for this project or to access the main menu of that call agent to then access a data form for whatever the project of the next incoming call. The server 52 retains the incoming completed data forms and extracts the data for storage in a data base for latter assembly into the several reports to be provided to the client or customer by, for example, operating the customer processor 58 (FIG. 1). In other words, the customer may be at a remote location and access data being collected virtually in real time. For example, if a solicitation is associated with a television program, the customer may monitor the call response extend a calling window or period during television program to accommodate all the in-bound telemarketing calls or provide other programming options.

Figure 14:
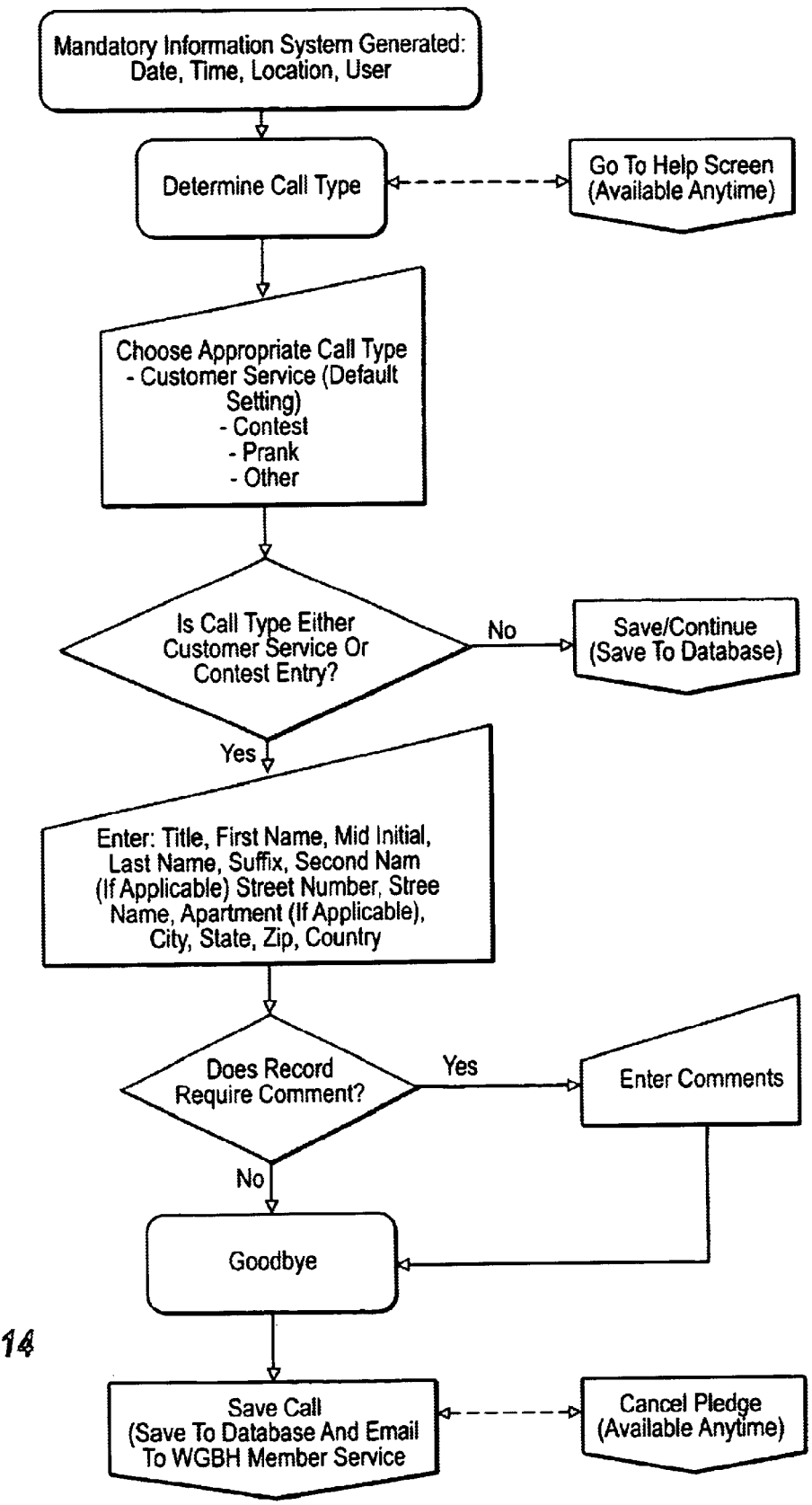
FIG. 14 is a schematic script diagram showing the steps in a data form to be filled in by the operator at a call processing center of the present invention.

For some solicitations or programs, calls may be received for reasons other than to respond to the particular promotion, advertisement or solicitation. FIGS. 14 and 15 show logic flow FIG. 14 which is a script for "other calls" and the form for "other calls" incorporated into a single form which is FIG. 15. The form is used when the customer wishes to track responses for other calls. The completed data form also may be sent to the server 52 via the internet 30.

It should be noted that the server 52 also includes a database memory 140 that is used to store the data extracted from the completed data forms. The data is in effect the order or pledge information obtained by each of the operators that has processed an in-bound call. The database memory 140 can be used to store the in-bound call information in several files for multiple programs and for multiple advertisers/solicitors.

The master processor 62 may ask the server to prepare a variety of reports which can be made only in a predetermined format. For instance, in the case where a public broadcast channel is showing a series of documentaries with a fund raising format, the server 52 is capable of analyzing the in-bound calls to assemble a report that, may help the customer analyze the data to identify the documentaries that attracted the greatest audience and/or the greatest number of pledges. The customer interface portion 60 preferably permits a customer to extract in-bound call related information from the server 52.

To the extent it may not be understood, all the computers in use in the system hereinbefore described are typically IBM compatible personal computers having an input device which is a keyboard, a memory and a screen. Other forms of computers such as the Macintosh/APPLE computers may also be used if properly programmed to interface as necessary with a browser or another type of web-enabling or web-accessing device.

Operation of the system 10 generally involves an initialization phase and an operational phase. The initialization phase involves communications between the customer and the system administrator or the operator of the master processor 62. As a result the master processor 62 is operated to: (1) identify the call center or call centers that will process the in-bound calls for the customer; (2) to configure or select a call distribution device (e.g., 800 phone lines through a switcher or through the internet 30 to call process centers 16A–D) that is capable of distributing in-bound calls to the identified call center or call centers; (3) prepare a project set-up page for entry into the server 52 to identify what information is to be captured and in what order and then to set up a data form or data entry page to identify the data to be obtained from the caller by constructing a data form and script integral therewith to obtain the desired information and installing the script and data form in the server 52; (4) configuring the server 52 to supply the script and data form together to the call distribution centers 16A–D and the in-bound call telemarketing computer means 21; and (5) configuring the server 52 to have a data base to receive and store the completed data forms and the data thereon. The operational phase involves: (a) the receipt of an in-bound call by the call distribution device; (b) the distribution of the received in-bound call to a call center or one call center of a group of call centers; (c) obtaining, by an operator at the selected call center, of information from the caller that is needed to process the caller's order or pledge; (d) the transfer of the information over a computer network to an in-bound call telemarketing computer 21; and (e) the transfer of the in-bound call information from the in-bound processing center computer means 21 to the server 52 and then to the customer or advertiser/solicitor.

With respect to the illustrated embodiment of the system 10, the call centers 16A–D are identified as the call centers that will process the in-bound calls for a particular customer advertiser/solicitor. The call distribution means 14 is established to distribute in-bound calls to the call centers 16A–D. Typically, the establishment of or selection of the call distribution means 14 includes defining the rules or establishing a protocol according to which the in-bound telemarketing calls will be distributed to the call centers 16A–D to address the anticipated in-bound call pattern and the staffing at the individual call centers 16A–D. An administrator uses the master processor 62 to establish a communication channel with the in-bound processing center computer means 21 via the computer network 30. Once a communication channel is established, the administrator uses the master processor 62 to communicate set-up or configuration information for processing in-bound calls for a particular customer to the computer means 21 via the computer network 30. Alternately, the operator of the call processing center 16A–D may interrogate the server 52 and secure the necessary set up information and to secure one or more scripts and data forms for different programs to be ready to take calls that are mixed between several programs of one customer or several different customers. The administrator typically: (a) provides customer account information; (b) enables the server 52 so that the server 52 can manage in-bound telemarketing call related information for the particular customer; (c) identifies the call center or call centers 16A–D that will service the in-bound calls for the particular customer; (d) configures or formats scripts and data forms that will be provided to the operator or operators that service the in-bound calls for the particular customer; and (e) defines the degree and type of interface that each customer will have with the server 52 to control what information and operations the customer will be able to perform with the data extracted from the completed data forms.

Since the computer network 30 in the illustrated embodiment is the Internet, the communications are preferably conducted via HTML pages that are used to pass information back and forth between the master processor 62 and the server 52. Further, the administrator is able to specify or define the HTML pages that are used to define the interface that the customer is able to view and use with the customer computer 58. Other types of set-up or configuration information can be established if needed.

Once the administrator has established the necessary set-up or configuration needed to make the system 10 operational with respect to the particular customer or advertiser/solicitor, the operation phase commences some action by the customer or advertiser/solicitor to trigger in-bound telemarketing calls. Upon receipt of in-bound telemarketing calls 20 for the customer or advertiser/solicitor, the call receiving means 12 directs them to the call distribution means 14; and in turn they are then distributed to one or more call processing centers 16A-D. Typically, the in-bound calls are distributed according to a protocol as hereinbefore discussed. The call processing center 16A-D that receives an in-bound telemarketing call distributed by the call distribution means 14 distributes the call to which is accepted by the operator in the call processing center. The operator that answers the in-bound call is initially provided with information that identifies the telephone number or entity that the caller was calling because the number called identifies the program to which the call relates. The call distribution means 14 provides this information to the operator so that if the call processing center 16A-D and more specifically, the operator processing in-bound calls is able to identify the program to which the call relates and to ask the appropriate questions to process the in-bound telemarketing call.

With the in-bound telemarketing call connected, the operator may access the server 52 to call up the correct script and data form or pull them from the web page of the web site accessible by the internet 30 created by the server 52 and in-bound data form. The operator is then able to follow the script and fill in the form so that the caller's order or request or pledge can be processed. The operator then transmits the completed data form back to the web site or to the server 52.

It should be understood that after the appropriate script for the caller is available on the process center computer means, the operator asks the caller the questions set forth in the script and enters the information in the blanks of the web page or pages that set forth the script.

The in-bound call information for a particular customer or advertiser/solicitor is stored in the database memory 32 and not communicated to the customer or advertiser/solicitor upon receipt, the information is typically communicated to the customer or advertiser/solicitor at some later time.

As part of the operational phase, the administrator is able operate the master processor 62 to alter any set-up or configuration parameters by communication with the server 52. Similarly, the customer or advertiser/solicitor is able to communicate with the server 52 by use of the customer processor 58. The functions that a customer or advertiser/solicitor may be able to perform include: (a) requesting in-bound call information; (b) requesting a report that contains an analysis of in-bound call information; and (c) decrementing the inventory of goods or services that the customer advertiser/solicitor is providing to callers so that the operator does not commit to providing a caller with a good or service that the advertiser/solicitor is no longer able to provide or incrementing when fund collection is the issue. Other types or alternative functions are also feasible.

While the system 10 and its operation have been primarily described with respect to the processing of in-bound telemarketing calls for a single television or radio station seeking to raise funds by presenting fund raising promotional programming followed by a solicitation period. However, it should be appreciated that the system 10 is capable of processing in-bound calls for a plurality of advertisers and/or solicitors at the same time. For example, in the illustrated embodiment, call centers 16A and 16B could be dedicated to processing calls for an advertiser and seller of clothing while call centers 16C and 16D could be dedicated to processing the calls for a non-profit solicitor.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

I claim:

1. A system for processing in-bound telemarketing calls, said system comprising:

call receiving means for receiving a plurality of in-bound telemarketing calls;

call distribution means connected to said call receiving means for receiving said in-bound telemarketing calls therefrom and for distributing each of said in-bound telemarketing calls in accordance with a distribution protocol;

computer network means for communicating data between and among computer-like devices;

a plurality of call processing centers each connected to said call distribution means to receive an in-bound telemarketing call from said call distribution means, each of said plurality of call processing centers being operable by an operator to answer said in-bound telemarketing call received from said call distribution means for establishing two-way communications with the caller of said in-bound telemarketing call, and each of said plurality of call processing centers having process center computer means connected to said computer network to obtain a first script and a first data form therefrom, said process center computer means being adapted to be operable by said operator to visually present the operator with said first data form and said first script, said process center computer means being adapted for recording by the operator on said first data form desired caller information obtained by the operator from the caller using said first script to form a first completed data form, and said process center computer means being adapted to transmit to said computer network means said first completed data form; and server means connected to said computer network means, said server means being operable for storing said first data form and for transmitting said first data form and said first script to a first call processing center upon request from a processing center computer means of a call processing center of said plurality of call processing centers, and said server means being operable for receiving and storing said first completed data form with caller data from said processing center computer means through said computer network means;

a master processor operable to create and modify said first script and to create and modify said first data form, said master processor being connected to said server means for supplying said first script and said first data form thereto; and customer computer means connected to said server means and operable to selectively access data obtained by said server in said first completed data form from at least one of said plurality of call processing centers.

2. The system of claim 1 wherein each process center computer means is connected to said computer network to obtain therefrom said first script, said process center computer means being operable by said operator to visually present to said operator said first script for delivery by the operator to the caller, and wherein said server means is operable for storing said first script and for supplying said first script to said computer network means upon request through said computer network means, from a call processing center computer means of a call processing center of said plurality of call processing centers.

3. The system of claim 2 wherein said master processor is connected to said server means to create, modify and supply a plurality of scripts including said first script and wherein said master processor is connected to said server means to create, modify and supply a corresponding plurality of data forms for each of said plurality of scripts.

4. The system of claim 3 wherein said server means includes a customer interface portion connected to interface between said server means and said customer computer means.

5. The system of claim 4 wherein said customer computer means is connected to the computer network means.

6. The system of claim 2 wherein said server means includes an administrative interface portion connected to interface between said server means and said master processor.

7. The system of claim 6 wherein said master processor is connected to said computer network means.

8. The system of claim 1 further including first interface means connected between said call distribution means and each of said plurality of call processors for routing calls from said call distribution means to each of said plurality of call processors.

9. The system of claim 8 wherein said first interface means is a call distribution network.

10. The system of claim 8 wherein said first interface means is the world wide web.

11. The system of claim 9 wherein said first call processing center includes means for receiving and processing multiple telemarketing calls at the same time.

12. The system of claim 1 further including ISP means connected to and between said server means and said computer network means.

13. The system of claim 1 wherein said computer network means is the world wide web.

14. The system of claim 13 wherein each said process center computer means is programed to include a browser for accessing said world wide web.

15. The system of claim 14 wherein each server means is programmed to include a browser for accessing said world wide web.

16. The system of claim 2 wherein said first script and said first data form are integrated to provide instructions to the operator to assist in obtaining data for said first data form as said first data form is being filled in by the operator.

17. The system of claim 2 wherein said server means is programmed to have a data base to retain the caller data of a plurality of telemarketing calls received by each of said call processing centers.

18. The system of claim 3 wherein said server means has first password means to limit access of said process center computer means to obtain upon request only a preselected first script and a first data form therefrom.

19. The system of claim 18 wherein said server means has second password means to limit access of said customer computer means to selected data from said first completed data form.

20. A system for processing in-bound telemarketing calls, said system comprising:

call receiving means for receiving a plurality of in-bound telemarketing calls;

call distribution means connected to said call receiving means for receiving said in-bound telemarketing calls therefrom and for distributing each of said in-bound telemarketing calls in accordance with a distribution protocol;

computer network means for communicating data between and among computer-like devices;

a plurality of call processing centers each connected to said call distribution means to receive an in-bound telemarketing call from said call distribution means, each of said plurality of call processing centers being operable by an operator to answer said in-bound telemarketing call received from said call distribution means for establishing two-way communications with the caller of said in-bound telemarketing call, and each of said plurality of call processing centers having process center computer means connected to said computer network to obtain a first script and a first data form therefrom, said process center computer means being adapted to be operable by said operator to visually present the operator with said first data form and said first script, said process center computer means being adapted for recording by the operator on said first data form desired caller information obtained by the operator from the caller using said first script to form a first completed data form, and said process center computer means being adapted to transmit to said computer network means said first completed data form; and server means connected to said computer network means, said server means being operable for storing said first data form and said first script and for transmitting said first data form and said first script to a first call processing center upon request from a processing center computer means of a call processing center of said plurality of call processing centers, and said server means being operable for receiving and storing said first completed data form with caller data from said processing center computer means through said computer network means;

a master processor operable to create and modify said first script and to create and modify said first data form, said master processor being connected to said server means for supplying said first script and said first data form thereto;

customer computer means connected to said server means and operable to selectively access data obtained by said server in said first completed data form from at least one of said plurality of call processing centers; and a call center manager processor connected to said server means to receive said first data form there from and for supplying signals to edit said first form and to supply signals to regulate a plurality of call processing centers.

21. A method for processing in-bound telemarketing calls, method comprising:

providing call receiving means for receiving a plurality of in-bound telemarketing calls, call distribution means connected to said call receiving means for receiving said in-bound telemarketing calls therefrom and for distributing each of said in-bound telemarketing calls in accordance with a distribution protocol, computer network means for communicating data between and among computer-like devices, a plurality of call processing centers each connected to said call distribution means for receiving an in-bound telemarketing call from said call distribution means, each of said plurality of call processing centers being operable by an operator to answer said in-bound telemarketing call received from said call distribution means for establishing two-way communications with the caller of said in-bound telemarketing call, and each of said plurality of call processing centers having process center computer means connected to said computer network to obtain a first script and a first data form therefrom, said process center computer means being adapted to be operable by said operator to visually present the operator with said first script and said first data form, said process center computer means being adapted for recording by the operator on said first data form desired caller information obtained by the operator from the caller to form a completed first data form, and said process center computer means being adapted to transmit to said computer network means said completed first data form;

server means connected to said computer network means, said server means being operable for storing a plurality of scripts and for selecting one script of said plurality of scripts for transmission as a said first script, and for storing a plurality of first data forms and selecting one data form of said plurality of said data forms for transmission as said first data form;

a master processor operable to create and modify said first script and to create and modify said first data form, said master processor being connected to said server means for supplying said first script and said first data form thereto; and customer computer means connected to said server means and operable to selectively access data obtained by said server in said first completed data form from at least one of said plurality of call processing centers;

operating said call distribution means to distribute each of said in-bound telemarketing calls to one or more selected call processing centers;

operating each call processing center to receive in-bound telemarketing calls to establish two way communications with the caller;

operating the process center computer means to call up one of a plurality of scripts;

causing said process center computer means to request said first data form and said first script from said server means;

reading said first script and filling in said first data form to create a first completed data form;

causing said process center computer means to send said first completed data form to said server means;

operating said master processor to prepare and edit said first script and said first data form; and operating said customer processor means to obtain selected data from said server means.

22. The method of claim 21 wherein said computer network means is the world wide web.

23. The method of claim 21 wherein said first script includes a plurality of steps each to secure caller data.

24. The method of claim 21 wherein said first script is a script for fund raising and wherein said first data form is a first contribution data form.

25. The method of claim 21 wherein said first script and said first form are configured for the user to identify one triggering event of several triggering events that stimulated the user to place the telemarketing call.

26. The method of claim 25 wherein said first script is for fund raising for a radio or televison channel that has presented one or more shows to promote donations, and wherein said triggering events are a plurality of shows presented to promote donations.

27. A method for processing in-bound telemarketing calls, method comprising:

providing call receiving means for receiving a plurality of in-bound telemarketing calls, call distribution means connected to said call receiving means for receiving said in-bound telemarketing calls therefrom and for distributing each of said in-bound telemarketing calls in accordance with a distribution protocol, computer network means for communicating data between and among computer-like devices, a plurality of call processing centers each connected to said call distribution means for receiving an in-bound telemarketing call from said call distribution means, each of said plurality of call processing centers being operable by an operator to answer said in-bound telemarketing call received from said call distribution means for establishing two-way communications with the caller of said in-bound telemarketing call, and each of said plurality of call processing centers having process center computer means connected to said computer network to obtain a first script and a first data form therefrom, said process center computer means being adapted to be operable by said operator to visually present the operator with said first script and said first data form, said process center computer means being adapted for recording by the operator on said first data form desired caller information obtained by the operator from the caller to form a completed first data form, and said process center computer means being adapted to transmit to said computer network means said completed first data form;

server means connected to said computer network means, said server means being operable for storing a plurality of scripts and for selecting one script of said plurality of scripts for transmission as a said first script, and for storing a plurality of first data forms and selecting one data form of said plurality of said data forms for transmission as said first data form, said first script and said first form being configured for the user to identify one triggering event of several triggering events that stimulated the user to place the telemarketing call, said first script being for fund raising for a radio or television channel that has presented one or more shows to promote donations as triggering events, said first script being configured to provide the caller with a promotional gift selection tied to the show presented to promote donations, said first script being configured to prompt the caller to select the first promotional gift correlated to a selected show of said one or more shows, and said first contribution data form being configured to cause the first promotional gift to be identified to the operator upon identification of said selected show;

operating said call distribution means to distribute each of said in-bound telemarketing calls to one or more selected call processing centers;

operating each call processing center to receive in-bound telemarketing calls to establish two way communications with the caller;

operating the process center computer means to call up one of a plurality of scripts;

causing said process center computer means to request said first data form and said first script from said server means;

reading said first script and filling in said first data form to create a first completed data form; and causing said process center computer means to send said first completed data form to said server means.

28. The method of claim 27 wherein a master processor is provided and connected to said server means and wherein said master processor is operated to supply a plurality of scripts including said first script thereto and for suppling a plurality of data forms including said first data form thereto.

29. The system of claim 28 wherein a customer computer means is provided and connected to said server means, and wherein said customer computer means is operated to extract caller information there from.

30. A method for processing in-bound telemarketing calls to receive pledges for an entity having presented a plurality of fund raising events, said method comprising:

providing call receiving means for receiving a plurality of in-bound telemarketing calls;

call distribution means connected to said call receiving means for receiving said in-bound telemarketing calls therefrom and for distributing each of said in-bound telemarketing calls in accordance with a distribution protocol;

computer network means for communicating data between and among computer-like devices;

a plurality of call processing centers each connected to said call distribution means for receiving an in-bound telemarketing call from said call distribution means, each of said plurality of call processing centers being operable by an operator for establishing two-way telephone communications with the caller of said in-bound telemarketing call, and each of said plurality of call processing centers having process center computer means connected to said computer network to obtain a first script and a first data form therefrom, said process center computer means being adapted to be operable by said operator to visually present the operator with said first script and said first data form, said process center computer means being adapted for recording by the operator on said first data form desired caller information obtained by the operator from the caller to form a completed first data form, and said process center computer means being adapted to transmit to said computer network means said completed first data form; and server means connected to said computer network means, said server means being operable for storing a plurality of scripts for each of a plurality of fund raising events and for selecting one script of said plurality of scripts for transmission as a said first script, and for storing a plurality of first data forms for each of said plurality of fund raising events and selecting one data form of said plurality of said data forms for transmission as said first data form;

a master processor operable to create and modify said first script and to create and modify said first data form, said master processor being connected to said server means for supplying said first script and said first data form thereto; and customer computer means connected to said server means and operable to selectively access data obtained by said server in said first completed data form from at least one of said plurality of call processing centers;

operating said call distribution means to distribute each of said in-bound telemarketing calls to one or more selected call processing centers;

operating each call processing center to receive in-bound telemarketing calls to establish two way communications with the caller;

causing said process center computer means to request said first data form and said first script from said server means;

reading said first script to the caller and at the same time operating said process center computer means to fill in said first data form to create a first completed data form;

causing said process center computer means to send said first completed data form to said server means;

operating said master processor to prepare and edit said first script and said first data form; and operating said customer processor means to obtain selected data from said server means.

31. A method for processing in-bound telemarketing calls to receive pledges from viewers or listeners following one of a plurality of fund raising programs aired by a television or radio station, said method comprising:

first providing call receiving means for receiving a plurality of in-bound telemarketing calls;

call distribution means connected to said call receiving means for receiving said in-bound telemarketing calls therefrom and for distributing each of said in-bound telemarketing calls in accordance with a distribution protocol;

computer network means for communicating data between and among computer-like devices;

a plurality of call processing centers each connected to said call distribution means for receiving an in-bound telemarketing call from said call distribution means, each of said plurality of call processing centers being operable by an operator for establishing two-way telephone communications with the caller of said in-bound telemarketing call, and each of said plurality of call processing centers having process center computer means connected to said computer network to obtain a first script and a first data form therefrom, said process center computer means being adapted to be operable by said operator to visually present the operator with said first script and said first data form, said process center computer means being adapted for recording by the operator on said first data form desired caller information obtained by the operator from the caller to form a completed first data form, and said process center computer means being adapted to transmit to said computer network means said completed first data form; and server means connected to said computer network means, said server means being operable for storing a plurality of scripts for each of a plurality of fund raising events and for selecting one script of said plurality of scripts for transmission as a said first script, and for storing a plurality of first data forms for each of said plurality of fund raising events and selecting one data form of said plurality of said data forms for transmission as said first data form;

a master processor operable to create and modify said first script and to create and modify said first data form, said master processor being connected to said server means for supplying said first script and said first data form thereto; and customer computer means connected to said server means and operable to selectively access data obtained by said server in said first completed data form from at least one of said plurality of call processing centers;

operating said call distribution means to distribute each of said in-bound telemarketing calls to one or more selected call processing centers;

operating each call processing center to receive in-bound telemarketing calls to establish two way communications with the caller;

causing said process center computer means to request said first data form and said first script from said server means;

reading said first script to the caller and at the same time operating said process center computer means to fill in said first data form to create a first completed data form containing information including the identity of the caller, the identity of the program stimulating the call and the identity of the station that the caller was listening to or viewing; and causing said process center computer means to send said first completed data form to said server means;

operating said master processor to prepare and edit said first script and said first data form; and operating said customer processor means to obtain selected data from said server means.

32. The method of claim 31 wherein said process center computer means with said first data form and said first script together is configured to identify an optional gift which can be selected by the caller correlating to the magnitude of the contribution or pledge being made and also a selection of other gifts correlating to contributions or pledges at a magnitude less than the magnitude of the contribution or pledge being made.

* * * * *

UNITED STATES PATENT AND TRADEMARK OFFICE
CERTIFICATE OF CORRECTION

PATENT NO.     : 6,782,091 B1
DATED          : August 24, 2004
INVENTOR(S)    : Emerson C. Dunning, III It is certified that error appears in the above-identified patent and that said Letters Patent is hereby corrected as shown below:

Column 1,
Line 26, change "their" to -- a --.

Column 3,
Lines 51 and 53, change "suppling" to -- supplying --.

Column 4,
Line 17, change "IPS" to -- ISP --;
Line 21, change "programed" to -- programmed --;
Line 61, "televison" should be changed to -- television --.

Column 5,
Line 9, change "suppling" to -- supplying --.

Column 6,
Line 65, change "call distribution means" to -- call distribution means 14 --;
Line 67, change "centers" to -- call processing centers --.

Column 7,
Lines 7, 11-12, 14 and 24, change "call distribution system 14" to -- call distribution means 14 --;
Line 37, after "Further" insert -- , --;
Lines 66-67, change "call center computer means 21" to -- call or process center computer means 21 --.

Column 8,
Lines 4, 13, 37, 41, 46-47, 56 and 61, change "internet 30" to -- computer network 30 --;
Line 28, change "hand set 38" to -- phone set 38 --;
Lines 48-49, change "call processor" to -- call processing center --;
Line 52, change "call process center" to -- call processing centerline 57 --;
Line 57, change "ISP to -- ISP 54 --.

UNITED STATES PATENT AND TRADEMARK OFFICE
CERTIFICATE OF CORRECTION

PATENT NO. : 6,782,091 B1
DATED : August 24, 2004
INVENTOR(S) : Emerson C. Dunning, III It is certified that error appears in the above-identified patent and that said Letters Patent is hereby corrected as shown below:

Column 9,
Lines 2, 7-8, 9, 15, 33 and 56, change "internet 30" to -- computer network 30 --;
Line 7, change "thorough" to -- through --;
Line 13, change "manage" to -- manager --;
Line 15, change "server 53" to -- server 52 --;
Line 26, change "system" to -- call processing system 10 --;
Line 27, change "system 10" to -- call processing system 10 --;
Line 29-30, change "process center" to -- call center --;
Line 31, change "Each" to -- Each call center computer means 21 --;
Line 35, change "log in page" to -- log-in page 70 --;
Line 45, change "process center" to -- call center --;
Line 46, change "The" to -- A --;
Lines 53 and 54, change "administrator" to -- administrator 80 --;
Line 59, change "administrator 80" to -- master administrator 80 --;
Line 60, change "PROJECT SET UP" to -- PROJECT SET UP 82 --;
Line 62, change "LOCATION SET UP 82 to -- LOCATION SET UP 84 --;
Line 62, change "USER SET UP 84" to -- USER SET UP 85 --.

Column 10,
Line 7, delete "soles";
Line 11, change "MASTER ADMINISTRATOR" to -- master administrator 80 --;
Line 25, change "processor 62" to -- master processor 62 --;
Line 26, change "internet 30" to -- computer network 30 --;
Line 41, change "customer 104" to -- client manager or customer 104 --;
Line 45, change "programed" to -- programmed --;
Lines 47 and 51, change "client manager or customer 102" to -- client manager or customer 104 --;
Line 63, change "call agent" to -- operator or call agent 122 --;
Lines 64-65, change "processing center" to -- call center --.

UNITED STATES PATENT AND TRADEMARK OFFICE
CERTIFICATE OF CORRECTION

PATENT NO.    : 6,782,091 B1
DATED         : August 24, 2004
INVENTOR(S)   : Emerson C. Dunning, III It is certified that error appears in the above-identified patent and that said Letters Patent is hereby corrected as shown below:

Column 11,
Line 5, change "processing center" to -- call center --;
Line 12, change "network 52" to -- computer network 30 --;
Line 13, change "FIG. 17 the call center manager 140" to -- In FIG. 17 a call center manager 140 --;
Line 14, change "a call center processor 142A and 142B" to -- call center processors 142A and 142B --;
Line 15, change "the flash" to -- a flash --;
Line 20, change "internet" to -- computer network 30 --;
Line 23, change "data input 148" to -- data input screens 148 --;
Lines 29-30, change "call center manager 162 to -- call center manager 76 (FIG. 3) --;
Lines 35-36, 39, 41 and 48, change "master administrator 75" to -- system or master administrator 75 --;
Lines 52-53, change "call center managers 162" to -- call center managers 76 --;
Lines 62-63, change "program or show 129" to -- program or show 128 --.

Column 12,
Line 22, change "pledgor" to -- pledger --;
Line 26, insert -- , -- after "Thus";
Lines 37, 38, 39, 41 and 54, change "zip code" to -- zip code 182 --;
Lines 44-45, change "postal zip code" to -- zip code 182 --;
Line 57, change "If" to -- As provided at prompt 135, if --;
Line 60, after "generated" insert -- . --;
Line 62, change "process center computer means 121" to -- call center computer means 21 --.

Column 13,
Lines 7 and 15, change "computer means 21" to -- call center computer means 21 --;
Line 8, change "programed" to -- programmed --;
Lines 21 and 46, change "internet 30" to -- computer network 30 --;
Line 29, change "latter" to -- later --;
Line 47, change "database memory 140" to -- memory 36 --.

UNITED STATES PATENT AND TRADEMARK OFFICE
CERTIFICATE OF CORRECTION

PATENT NO. : 6,782,091 B1
DATED : August 24, 2004
INVENTOR(S) : Emerson C. Dunning, III It is certified that error appears in the above-identified patent and that said Letters Patent is hereby corrected as shown below:

Column 14,
Lines 7 and 40-41, change "system 10" to -- call processing system 10 --;
Line 15, change "internet 30" to -- computer network 30 --;
Lines 15 and 58, change "call process centers" to -- call processing centers --;
Line 25, change "call distribution centers" to -- call processing centers --;
Lines 26 and 36, change "telemarketing computer means 21" to -- center computer means 21 --;
Lines 37-38, change "in-bound processing center" to -- call processing center --;
Lines 41, 44, 48 and 50, change "call centers" to -- call processing centers --;
Line 52, change "in-bound processing center" to -- call center --;
Line 57, change "computer means 21" to -- call center computer means 21 --;
Line 67, change "call center or call centers 16A-D" to -- call processing centers 16A-D or call processing center 16E --.

Column 15,
Line 15-16, change "customer computer 58" to -- customer processor 58 --;
Line 19, change "system 10" to -- call processing system 10 --;
Line 24, change "in-bound telemarketing calls 20" to -- in-bound calls 20 --;
Line 27, change "one or more" to -- one or more of the --;
Line 28, change "in-bound calls" to -- in-bound calls 20 --;
Line 47, change "internet 30" to -- computer network 30 --;
Line 53, change "process center computer means" to -- call center computer means 21 --;
Line 58, change "database memory 32" to -- memory 36 --.

Column 16,
Line 59, change "computer network" to -- computer network means --.

Column 17,
Lines 8 and 12-13, change "processing center computer means" to -- said process center computer means --;
Line 21, change "server" to -- server means --;
Line 23, change "computer network" to -- computer network means --;
Lines 30-31, change "a call processing center computer means" to -- said process center computer means --;
Line 53, change "call processors" to -- call center processing centers --;
Lines 54-55, change "call processors" to -- call processing centers --.

UNITED STATES PATENT AND TRADEMARK OFFICE
CERTIFICATE OF CORRECTION

PATENT NO. : 6,782,091 B1
DATED : August 24, 2004
INVENTOR(S) : Emerson C. Dunning, III It is certified that error appears in the above-identified patent and that said Letters Patent is hereby corrected as shown below:

Column 18,
Line 2, change "programed" to -- programmed --;
Line 66, change "processing center" to -- process center --.

Column 19,
Line 15, change "method" to -- said method --;
Line 47, delete ";" after "form" and insert -- , --;
Line 59, delete ";" after "thereto;" and insert -- , --;
Line 8, change "server" to -- server means --.

Column 20,
Line 2, change "two way" to -- two-way --;
Line 30, change "televison" to -- television --;
Line 35, change "method" to -- said method --;
Line 67, delete ";" after "form" and insert -- , --.

Column 21,
Line 27, change "two way" to -- two-way --;
Line 41, change "suppling" to -- supplying --;
Line 52, delete ";" after "calls;" and insert -- , --;
Line 57, delete ";" after "protocol;" and insert -- , --;
Line 59, delete ";" after "devices" and insert -- , --.

Column 22,
Line 2, change "computer network" to -- computer network means --;
Line 13, change "form; and" to -- form, --;
Line 22, delete ";" after "form;" and insert -- , -- ;
Line 27, delete ";" after "thereto;";
Line 30, change "server" to -- server means --;
Line 37, change "two way" to -- two-way --;
Line 50, change "customer processor means" to -- customer computer means--;
Line 58, delete ";" after "calls;" and insert -- , --;
Line 63, delete ";" after "protocol;" and insert -- , --;
Line 65, delete ";" after "devices;" and insert -- , --.

UNITED STATES PATENT AND TRADEMARK OFFICE
CERTIFICATE OF CORRECTION

PATENT NO. : 6,782,091 B1
DATED : August 24, 2004
INVENTOR(S) : Emerson C. Dunning, III It is certified that error appears in the above-identified patent and that said Letters Patent is hereby corrected as shown below:

Column 23,
Line 19, change "form; and" to -- form, --;
Line 28, delete ";" after "form;" and insert -- , --;
Line 33, delete ";" after "thereto;" and insert -- , --.

Column 24,
Line 7, change "two way" to -- two-way --;
Line 15, change "a first" to -- said first --;
Line 25, change "customer processor means" to -- customer computer means --.

Signed and Sealed this

Fifth Day of April, 2005

JON W. DUDAS
*Director of the United States Patent and Trademark Office*